(12) United States Patent
Sharrah et al.

(10) Patent No.: US 8,371,729 B2
(45) Date of Patent: Feb. 12, 2013

(54) LIGHT WITH KEYING ARRANGEMENT MOUNTABLE ON A MOUNTING RAIL

(75) Inventors: Raymond L. Sharrah, Collegeville, PA (US); John C. DiNenna, Norristown, PA (US)

(73) Assignee: Streamlight, Inc., Eagleville, PA (US)

( * ) Notice: Subject to any disclaimer, the term of this patent is extended or adjusted under 35 U.S.C. 154(b) by 492 days.

(21) Appl. No.: 12/573,359

(22) Filed: Oct. 5, 2009

(65) Prior Publication Data
US 2010/0097789 A1    Apr. 22, 2010

Related U.S. Application Data

(60) Continuation-in-part of application No. 11/710,791, filed on Feb. 26, 2007, now Pat. No. 7,614,760, which is a division of application No. 11/268,787, filed on Nov. 8, 2005, now Pat. No. 7,188,978.

(60) Provisional application No. 60/627,860, filed on Nov. 15, 2004, provisional application No. 61/144,314, filed on Jan. 13, 2009.

(51) Int. Cl.
*F21V 21/00*    (2006.01)

(52) U.S. Cl. .................. 362/439; 42/146

(58) Field of Classification Search ............ 362/396, 362/648, 655, 438, 439; 248/228.5, 216.4, 248/230.3, 230.5, 316.6, 231.21, 231.41, 248/231.61; 42/146, 132, 124
See application file for complete search history.

(56) References Cited

U.S. PATENT DOCUMENTS

| | | | |
|---|---|---|---|
| 2,546,242 A | 3/1951 | Stinson | |
| 2,597,565 A | 5/1952 | Chandler et al. | |
| 2,601,613 A | 6/1952 | Jahncke | |
| 3,153,856 A | 10/1964 | Felix | |
| 3,488,488 A | 1/1970 | Crouch | |
| 3,512,290 A * | 5/1970 | Violette, Jr. et al. | 42/75.01 |
| 3,513,581 A | 5/1970 | Slater | |
| 3,877,166 A * | 4/1975 | Ward | 42/127 |
| 3,986,285 A * | 10/1976 | Krisay | 42/127 |
| 4,580,362 A | 4/1986 | Stevens | |
| 4,697,226 A * | 9/1987 | Verdin | 362/110 |
| 4,707,772 A * | 11/1987 | Jimenez et al. | 362/110 |
| 4,856,218 A | 8/1989 | Reynolds, Jr. | |
| 4,939,863 A | 7/1990 | Alexander et al. | |

(Continued)

FOREIGN PATENT DOCUMENTS

| | | |
|---|---|---|
| DE | 202004003173 | 9/2004 |
| JP | 1995119715 | 5/1995 |

(Continued)

OTHER PUBLICATIONS

European Patent Office, "Communication Pursuant to Article 94(3) EPC—Application No. 05 851 561.0", Dec. 1, 2011, 5 pages.

(Continued)

*Primary Examiner* — Julie Shallenberger
(74) *Attorney, Agent, or Firm* — Clement A. Berard, Esq.; Dann, Dorfman, Herrell & Skillman, PC

(57) ABSTRACT

A keyed mounting arrangement for a light or other object mountable on a mounting rail having a keying feature may comprise a body containing operating elements; a clamping arrangement including clamp members on the body for clamping and releasing the mounting rail; and a keying member removably disposed in a recess located on the body in a predetermined location and having a keying feature that engages the keying feature of the mounting rail when the body is clamped to the mounting rail. Where the object is mountable on mounting rails having keying features of different sizes and shapes, the keying member may be selected from a set of keying members for having a keying feature of a size and shape that corresponds to the size and shape of the keying feature of the mounting rail.

29 Claims, 14 Drawing Sheets

U.S. PATENT DOCUMENTS

| | | | |
|---|---|---|---|
| 5,180,220 | A | 1/1993 | Van Kalsbeek |
| 5,400,540 | A | 3/1995 | Solsinsky et al. |
| 5,430,967 | A * | 7/1995 | Woodman et al. ............... 42/114 |
| 5,522,167 | A | 6/1996 | Teetzel |
| 5,584,137 | A | 12/1996 | Teetzel |
| 5,628,555 | A | 5/1997 | Sharrah et al. |
| 5,685,105 | A | 11/1997 | Teetzel |
| 5,816,683 | A | 10/1998 | Christiansen |
| 5,913,669 | A | 6/1999 | Hansen et al. |
| 6,073,901 | A | 6/2000 | Richter |
| 6,115,952 | A | 9/2000 | Rigler |
| 6,185,854 | B1 | 2/2001 | Solinsky et al. |
| 6,230,431 | B1 | 5/2001 | Bear |
| 6,276,088 | B1 | 8/2001 | Matthews |
| 6,378,237 | B1 | 4/2002 | Matthews |
| 6,425,561 | B2 | 7/2002 | Wooten et al. |
| 6,574,901 | B1 | 6/2003 | Solinsky et al. |
| 6,609,810 | B2 | 8/2003 | Kim |
| 6,612,714 | B1 | 9/2003 | Morre et al. |
| 6,733,153 | B1 | 5/2004 | Lee |
| 6,764,194 | B1 | 7/2004 | Cooper |
| 6,874,269 | B2 * | 4/2005 | Chen et al. ......................... 42/85 |
| 7,117,624 | B2 | 10/2006 | Kim |
| 7,188,978 | B2 | 3/2007 | Sharrah et al. |
| D548,385 | S | 8/2007 | Sharrah et al. |
| 7,614,760 | B2 | 11/2009 | Sharrah et al. |
| 2003/0007355 | A1 | 1/2003 | Leen |
| 2003/0179572 | A1 | 9/2003 | Schnell |
| 2004/0068913 | A1 | 4/2004 | Solinsky et al. |
| 2004/0132342 | A1 | 7/2004 | Lien |
| 2004/0169119 | A1 | 9/2004 | Crowell et al. |
| 2006/0083008 | A1 | 4/2006 | Yu |
| 2006/0083009 | A1 | 4/2006 | Hsu |

FOREIGN PATENT DOCUMENTS

| | | |
|---|---|---|
| JP | 1998069807 | 3/1998 |
| WO | 00/77470 | 12/2000 |

OTHER PUBLICATIONS

Streamlight, Inc., "Product Catalog," Jun. 2001, Front Cover, pp. 1, 8-11, 28-29, 32-33, Rear Cover.

Streamlight, Inc., "M2 Universal Tactical Light," Product Package, Prior to Oct. 24, 2006, 1 Page.

Streamlight, Inc., "M2 Universal Tactical Light," Operator's Manual, Oct. 2003, 2 Pages.

Streamlight, Inc., "M-3 LED Tactical Navigation Light," Dated: 2002, Eagleville, PA, 2 Pages.

Streamlight, Inc., "M-6 Tactical Laser Illuminator," Dated 2003, Eagleville, PA, 2 Pages.

Streamlight, Inc., "Introducing The All-New MIL-SPEC X-Series—Trusted Tactical Lights Taken to the X-treme," Dated: Oct. 2003, Eagleville, PA, 2 Pages.

Streamlight, Inc., "L.A.M. Laser Aiming Module," Dated 2000, Eagleville, PA, 1 Page.

Streamlight, Inc., "Tactical Series Specifications," http://www.streamlight.com/tactical_specifications.htm, Printed Oct. 28, 2004, 3 Pages.

Streamlight, Inc., "Tactical Series Parts & Accessories," Specifications, http://www.streamlight.com/tactical_accessories.htm, Printed Oct. 28, 2004, 2 Pages.

Streamlight, Inc., Streamlight M-3 LED, Streamlight Products, http://www.streamlight.com/m3led_specs.htm, Printed Oct. 28, 2004, 1 Page.

Streamlight, Inc., Streamlight M-6, M-6 Tactical Laser Illuminator Specifications, http://www.streamlight.com/m6_specifications.htm, Printed Oct. 28, 2004, 1 Page.

Streamlight, Inc., "Streamlight Laser Aiming Module (L.A.M.)," Streamlight Products, http://www.streamlight.com/lam_specs.htm, Printed Oct. 28, 2004, 2 Pages.

Streamlight, Inc., "X-Series Specifications", http://www.streamlight.com/x-series_specs.htm, Printed Oct. 28, 2004, 2 Pages.

Streamlight, Inc., "Tactical Gun Mount Series—TLR-1", http://www.streamlight.com/product/product.aspx?pid=80, Printed Sep. 18, 2006, 1 Page.

Streamlight, Inc., "Tactical Gun Mount Series—TLR-2 With Laser Sight", http://www.streamlight.com/product/product.aspx?pid=81, Printed Sep. 18, 2006, 1 Page.

First Samco, "Tactical Light Holder," First Samco Tactical Accessories for AR15 & M/16, http://www.firstsamco.com/catalog/productdetail.php?ID=4, Printed Nov. 4, 2004, 1 Page.

First Samco, "Images for Tactical Light Holder," First Samco Tactical Accessories for AR15 & M/16, http://www.firstsamco.com/catalog/moreimages.php?ID=4, Printed Nov. 4, 2004, 1Page.

Insight Technology, Inc., M2 UTL Universal Tactical Light (with Photos), © 2004, http://www.insightlights.com/products/showProduct.asp?id=1, Printed Nov. 8, 2005, 4 Pages.

Insight Technology, Inc., "M3X Tactical Illuminator," © 2004, http://www.insightlights.com/products/showProduct.asp?id=6, Printed Oct. 28, 2004, 2 Pages.

Insight Technology, Inc., "M6 Tactical Illuminator (with Photos)," © 2004, http://www.insightlights.com/products/showProduct.asp?id=9, Printed Oct. 28, 2004, 5 Pages.

Insight Technology, Inc., "M6X Tactical Illuminator (with Photos)," © 2004 http://www.insightlights.com/products/showProduct.asp?id=11, Printed Oct. 28, 2004, 6 Pages.

Insight Technology, Inc., "XML X-treme Mini Light", © 2004, http://www.insightlights.com/products/showProduct.asp?id=2, Printed Oct. 28, 2004, 1 Page.

Insight Technology, Inc., "Tactical Lights by Insight Technology Inc. (UTL, M3, LAM)—Products by Product Index", © 2001, http://www.insightlights.com/oldsite/prodbyproducts.htm, Printed Sep. 18, 2006, 1 Page.

Insight Technology, Inc., "Tactical Lights by Insight Technology Inc. (UTL, M3, LAM)—The M3 Tactical Light", © 2001, http://www.insightlights.com/oldsite/prod_m3.htm, Printed Sep. 18, 2006, 1 Page.

Insight Technology, Inc., "Tactical Lights by Insight Technology Inc. (UTL, M3, LAM)—M3 Photo Gallery", © 2001, http://www.insightlights.com/oldsite/gallery_m3.htm, Printed Sep. 18, 2006, 1 Page.

Insight Technology, Inc., "Tactical Lights by Insight Technology Inc. (UTL, M3, LAM)—The M3-LED Tactical Illuminator", © 2001, http://www.insightlights.com/oldsite/prod_m3led.htm, Printed Sep. 18, 2006, 2 Pages.

Insight Technology, Inc., "Tactical Lights by Insight Technology Inc. (UTL, M3, LAM)—M3-LED Photo Gallery", © 2001, http://www.insightlights.com/oldsite/gallery_m3led.htm, Printed Sep. 18, 2006, 1 Page.

Insight Technology, Inc., "Tactical Lights by Insight Technology Inc. (UTL, M3, LAM)—The M4 and M4-Pro Tactical Light", © 2001, http://www.insightlights.com/oldsite/prod_m4.htm, Printed Sep. 18, 2006, 1 Page.

Insight Technology, Inc., "Tactical Lights by Insight Technology Inc. (UTL, M3, LAM)—M4 & M4-Pro Photo Gallery", © 2001, http://www.insightlights.com/oldsite/gallery_m4.htm, Printed Sep. 18, 2006, 1 Page.

Insight Technology, Inc., "Tactical Lights by Insight Technology Inc. (UTL, M3, LAM)—The M5 Tactical Light", © 2001, http://www.insightlights.com/oldsite/prod_m5.htm, Printed Sep. 18, 2006, 1 Page.

Insight Technology, Inc., "Tactical Lights by Insight Technology Inc. (UTL, M3, LAM)—M5 Photo Gallery", © 2001, http://www.insightlights.com/oldsite/gallery_{13} m5.htm, Printed Sep. 18, 2006, 1 Pg.

Insight Technology, Inc., "Tactical Lights by Insight Technology Inc. (UTL, M3, LAM)—The M6 Tactical Laser Illuminator", © 2001, http://www.insightlights.com/oldsite/prod_m6.htm, Printed Sep. 18, 2006, 2 Pages.

Insight Technology, Inc., "Tactical Lights by Insight Technology Inc. (UTL, M3, LAM)—M6 Photo Gallery", © 2001, http://www.insightlights.com/oldsite/gallery_m6.htm, Printed Sep. 18, 2006, 1 Pg.

Insight Technology, Inc., "Tactical Lights by Insight Technology Inc. (UTL, M3, LAM)—Laser Aiming Module (LAM)", © 2001, http://www.insightlights.com/oldsite/prod_lam.htm, Printed Sep. 18, 2006, 2 Pages.

Insight Technology, Inc., "Tactical Lights by Insight Technology Inc. (UTL, M3, LAM) LAM Photo Gallery", © 2001, http://www.insightlights.com/oldsite/gallery_lam.htm, Printed Sep. 18, 2006, 1 Pg.

Insight Technology, Inc., "Tactical Lights by Insight Technology Inc. (UTL, M3, LAM)—Parts & Accessories Photo Gallery", © 2001, http://www.insightlights.com/oldsite/gallery_access.htm, Printed Sep. 18, 2006, 2 Pages.

SureFire, "Laser Sights," Weapon mounted laser sights from SureFire, © 2001-2004, http://www.surefire.com/maxexp/main/co_disp/displ/pgrfnbr/364/seset/00, Printed Oct. 28, 2004, 1 Pg.

SureFire, "Weapon Lights," Lights for weapons including handguns, shotguns, and rifles, © 2001-2004, http://www.surefire.com/maxexp/main/co_disp/displ/pgrfnbr/211/sesent/00, Printed Oct. 28, 2004, 1 Pg.

SureFire, "Handgun Weapon Lights," Handgun Tactical WeaponLights provided by SureFire, © 2001-2004, http://www.surefire.com/maxexp/main/co_disp/displ/carfnbr/91/sesent/00, Printed Oct. 28, 2004, 2 Pages.

SureFire, "Products," X200 WeaponLight—X200 available from SureFire, © 2001-2004, http://www.surefire.com/maxexp/main.pl?pgm-co_disp&func-displ&strfnbr=6&prrfnbr=1110& . . . , Printed Oct. 28, 2004, 2 Pages.

SureFire, "SureFire Integrated Shotgun WeaponLights," Shotgun WeaponLights provided by SureFire, © 2001-2004, http://www.surefire.com/maxexp/main/co_disp/displ/carfnbr/92/sesent/00, Printed Oct. 28, 2004, 1 Page.

SureFire, "Rifle, Carbine & SMG Light Systems", Rifle, Carbine & SMG WeaponLights Systems provided by SureFire, © 2001-2004, http://www.surefire.com/maxexp/main/co_disp/displ/carfnbr/93/sesent/00, Printed Oct. 28, 2004, 1 Page.

SureFire, "Rifle, Carbine & SMG Light Systems," Millennium Forends provided by SureFire, © 2001-2004, http://www.surefire.com/maxexp/main/co_disp/displ/carfnbr/265/sesent/00, Printed Oct. 28, 2004, 1 Page.

SurFire, "Rifle, Carbine & SMG Light Systems," Millennium Universal WeaponLights provided by SureFire, © 2001-2004, http://www.surefire.com/maxexp/main/co_disp/displ/carfnbr/267/sesent/00, Printed Oct. 28, 2004, 1 Page.

SureFire, "Rifle, Carbine & SMG Light Systems," Millennium Vertical Foregrip System provided by SureFire, © 2001-2004, http://www.surefire.com/maxexp/main/co_disp/displ/carfnbr/266/sesent/00, Printed Oct. 28, 2004, 1 Page.

SureFire, "Rifle, Carbine & SMG Light Systems," Classic Series WeaponLights provided by SureFire, © 2001-2004, http://www.surefire.com/maxexp/main/co_disp/displ/carfnbr/271/sesent/00, Printed Oct. 28, 2004, 1 Page.

SureFire, "Weapon Mounts," SureFire Weapon Mounts, © 2001-2004, http://www.surefire.com/maxexp/main/co_disp/displ/pgrfnbr/378/sesent/00, Printed Oct. 28, 2004, 1 Pg.

SureFire, "Products Weapon Mounts,"Picatinny forends provided by SureFire, © 2001-2004, http://www.surefire.com/maxexp/main/co_disp/displ/carfnbr/312/sesent/00, Printed Oct. 28, 2004, 1 Pg.

SureFire, "Products Weapon Mounts," S.I.R. System C (Selective Integrated Rail)—M61 available from SureFire, © 2001-2004, http://www.surefire.com/maxexp/main/co_disp/displ/prrfnbr/824/sesent/00, Printed Oct. 28, 2004, 1 Page.

Patent Cooperation Treaty, "International Search Report—PCT/US05/41002", Nov. 17, 2006, 2 pages.

Falcon Tactical, "Sig Sauer Stoplite Vertical Grip with Weaponlight", http://www.falcontactical.net/sigsastvegrw.html, © 2006-2009, 2 pages.

* cited by examiner

SECTION 8-8

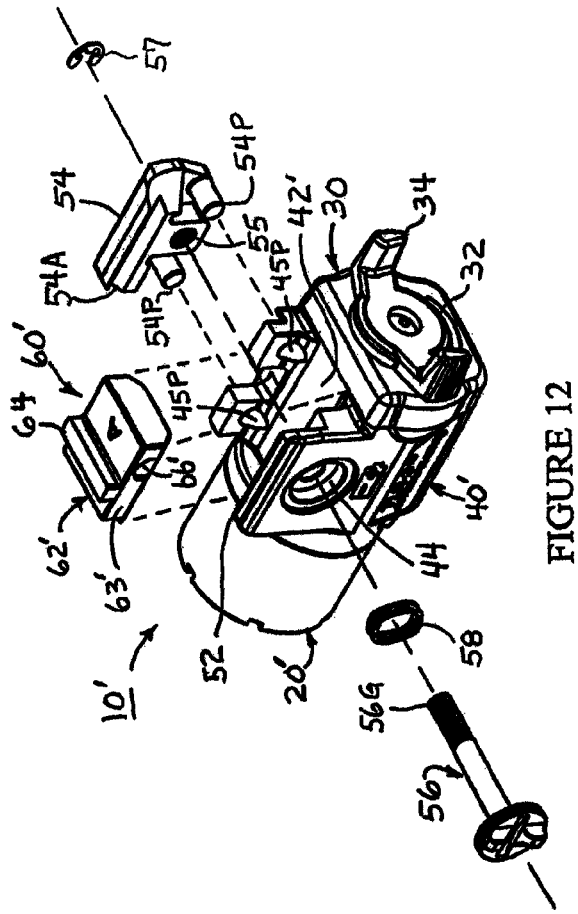
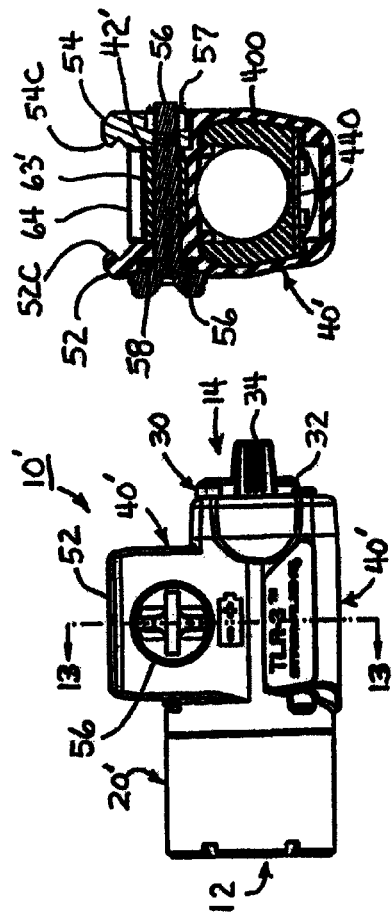
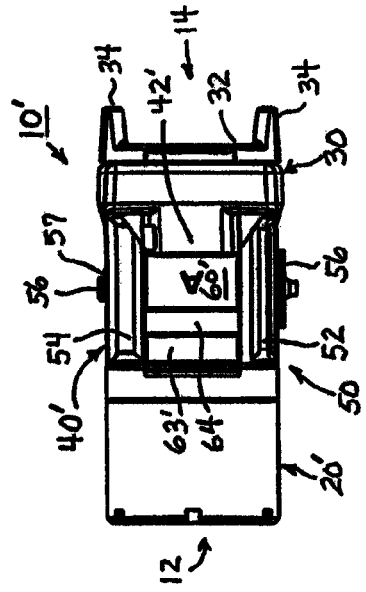

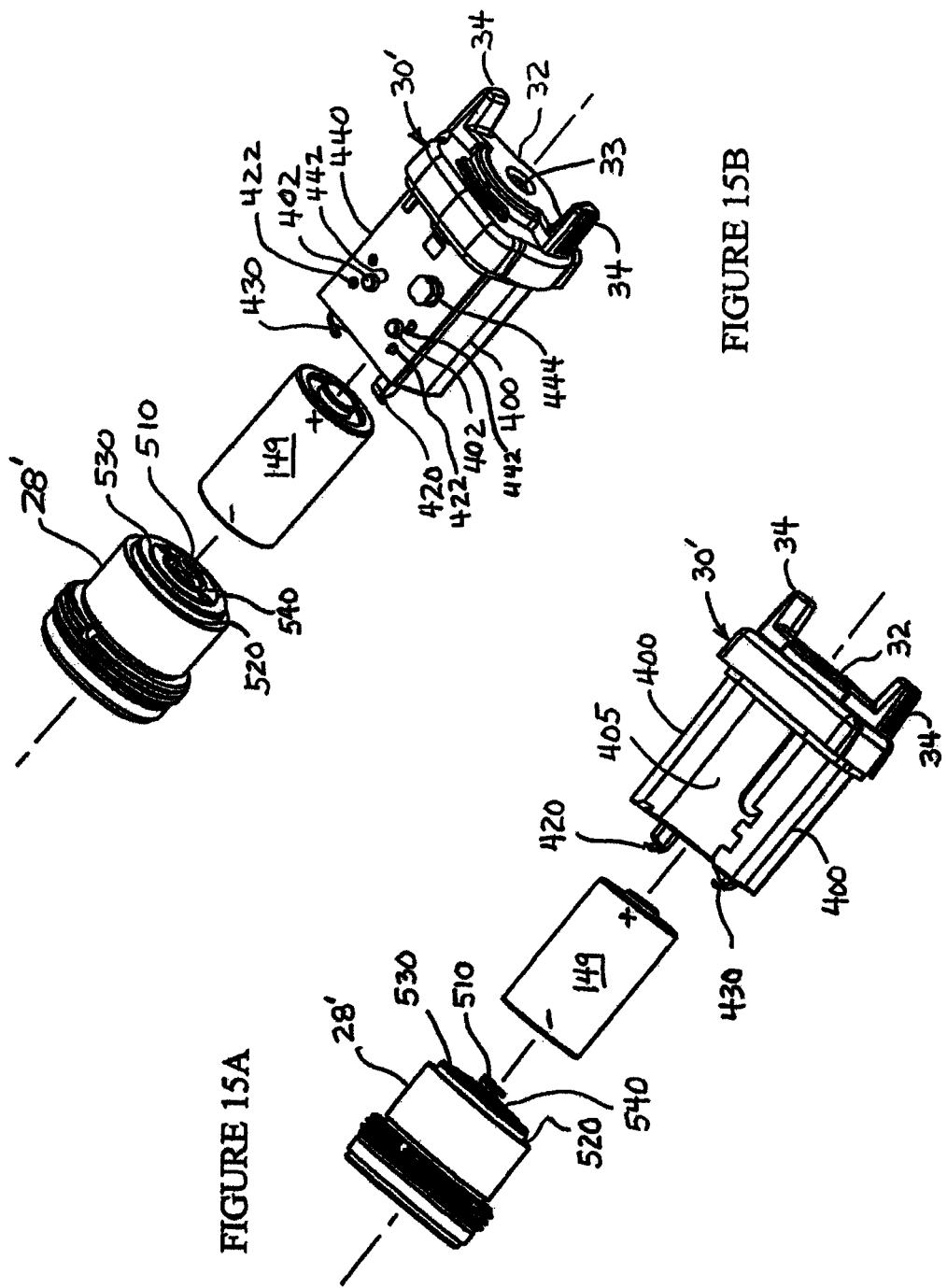

LIGHT WITH KEYING ARRANGEMENT MOUNTABLE ON A MOUNTING RAIL

This application is a continuation-in-part of U.S. patent application Ser. No. 11/710,791 filed Feb. 26, 2007 now U.S. Pat. No. 7,614,760, which is a division of U.S. patent application Ser. No. 11/268,787 filed Nov. 8, 2005, now U.S. Pat. No. 7,188,978, which claims the benefit of the priority of U.S. Provisional Patent Application No. 60/627,860 filed Nov. 15, 2004, and this Application further claims the benefit of U.S. Provisional Patent Application No. 61/144,314 filed Jan. 13, 2009, all of which are incorporated herein by reference in their entireties.

The present invention relates to a light or other mountable object having a keying arrangement, and in particular to a light or other object having a keying arrangement with interchangeable keys.

Lights may be held in hand or may be mounted to an object. Lights may be mounted to various objects, such as tools or implements so that they provide light directed toward the work area of the working end of the tool or implement. Tools or implements of this sort typically have a mounting rail attached thereto, e.g., by the manufacturer, by a seller or by a user. One object to which lights may be mounted is a firearm, such as a handgun or pistol, a long gun or rifle, a shotgun, or another type of gun or weapon, any one or more of which are typically referred to as a gun. Gun mountable lights may be for illumination or for aiming, or both. Lights for illumination typically utilize a lamp such as an xenon-filled or a halogen-filled lamp or a high-powered light-emitting diode (LED) light source. Lights for aiming typically utilize a laser diode or other laser light source.

The arrangement for mounting such lights on a gun is, for the typical gun, similar to the arrangement for mounting a telescopic sight on a gun. A gun mount, also called a gun rail or a mounting rail, is typically provided in a convenient location that affords a forward-looking view for a light mounted thereon. Because a telescopic sight or other sight is typically mounted on the top or upper surface of the gun barrel, a separate mount is often provided on the side or underside (bottom) surface of the gun barrel, typically near to the muzzle end thereof.

Conventional gun-mountable lights typically have a plastic body having cleats that slide onto the gun mount and have a spring-loaded cross bar that snaps into a slot on the gun mount when the light is slid onto the gun rail to a desired position. The spring-loaded cross bar provides sufficient tension to secure the light on the gun rail when the gun is fired, and has protruding ends that can be manipulated for disengaging the cross bar so that the light can be removed, i.e. can be slid off of the gun rail. Such slide-on mounts typically do not provide a snug fit on the mounting rail, and so there is substantial play which introduces variation into the direction in which the mounted object points, and so such play is generally undesirable.

Different gun manufacturers provide gun rails that differ in shape and/or size and/or configuration, and some so that a conventional gun-mountable light can only properly mount on gun rails of particular guns or from particular manufacturers. Certain mounting rails have a recess or a projection for keying with a corresponding projection or recess of the light that is mountable to such rail, and because keying arrangements also differ for particular manufacturers, the number of configurations that have to be dealt with increases further. As a result, a gun owner would have to have different lights for his guns from different manufacturers. In addition, slide-on type gun mounted objects can not mount without play and in a repeatable manner as is necessary for an aiming type of device.

In addition, many conventional gun mounts require a hand placement by a user when attaching or removing the gun-mountable object that may place the user's hand or part thereof in front of the muzzle, thereby placing the user in danger of injury should the firearm unintentionally discharge.

Accordingly, there is a need for a mounting arrangement and for a mountable light or other mountable object that may be mounted to mounts of differing size or shape or configuration. In addition, it would be desirable that such light or other object have keying for being easily mountable and demountable to mounts having differing keying.

To this end, a keyed mounting arrangement for a light or other object mountable on a mounting rail having a keying feature may comprise a body containing operating elements; a clamping arrangement including clamp members on the body for clamping and releasing the mounting rail; and a keying member removably disposed in a recess located on the body in a predetermined location and having a keying feature that engages the keying feature of the mounting rail when the body is clamped to the mounting rail.

Where the light or other mountable object is mountable on mounting rails having keying features of different sizes and shapes, and the keying member may be selected from a set of keying members for having a keying feature of a size and shape that corresponds to the size and shape of the keying feature of the mounting rail.

According to another aspect, a set of interchangeable keying members for keying a mountable body may comprise: a key body of a size and a shape for being disposed in a recess of the mountable body and that is for being engaged when the key body is disposed in the recess; a keying feature having a size and a shape corresponding to the keying feature of the mounting rail and being positioned for engaging the keying feature of the mounting rail when the mountable body is mounted to the mounting rail; and wherein the size, or shape, or position, or a combination of size, shape and position, of the keying feature on the key body may be different.

BRIEF DESCRIPTION OF THE DRAWING

The detailed description of the preferred embodiment will be more easily and better understood when read in conjunction with the FIGURES of the Drawing which include:

FIG. 2 comprising

FIG. 10 is a view of the side of another example embodiment of a mountable light;

FIG. 11 is a view of the top of the example embodiment of a mountable light of FIG. 10 showing the mounting arrangement thereof;

FIG. 12 is an exploded isometric view of the example embodiment of a mountable light of FIGS. 10 and 11;

FIG. 13 is a sectional view of the example embodiment of a mountable light of FIGS. 10-12 taken at section 13-13 of FIG. 10;

FIG. 15A is an exploded side view and FIG. 15B is an exploded isometric view showing an example internal arrangement of the example embodiment of a mountable light of FIGS. 10 and 11;

Figure 1:
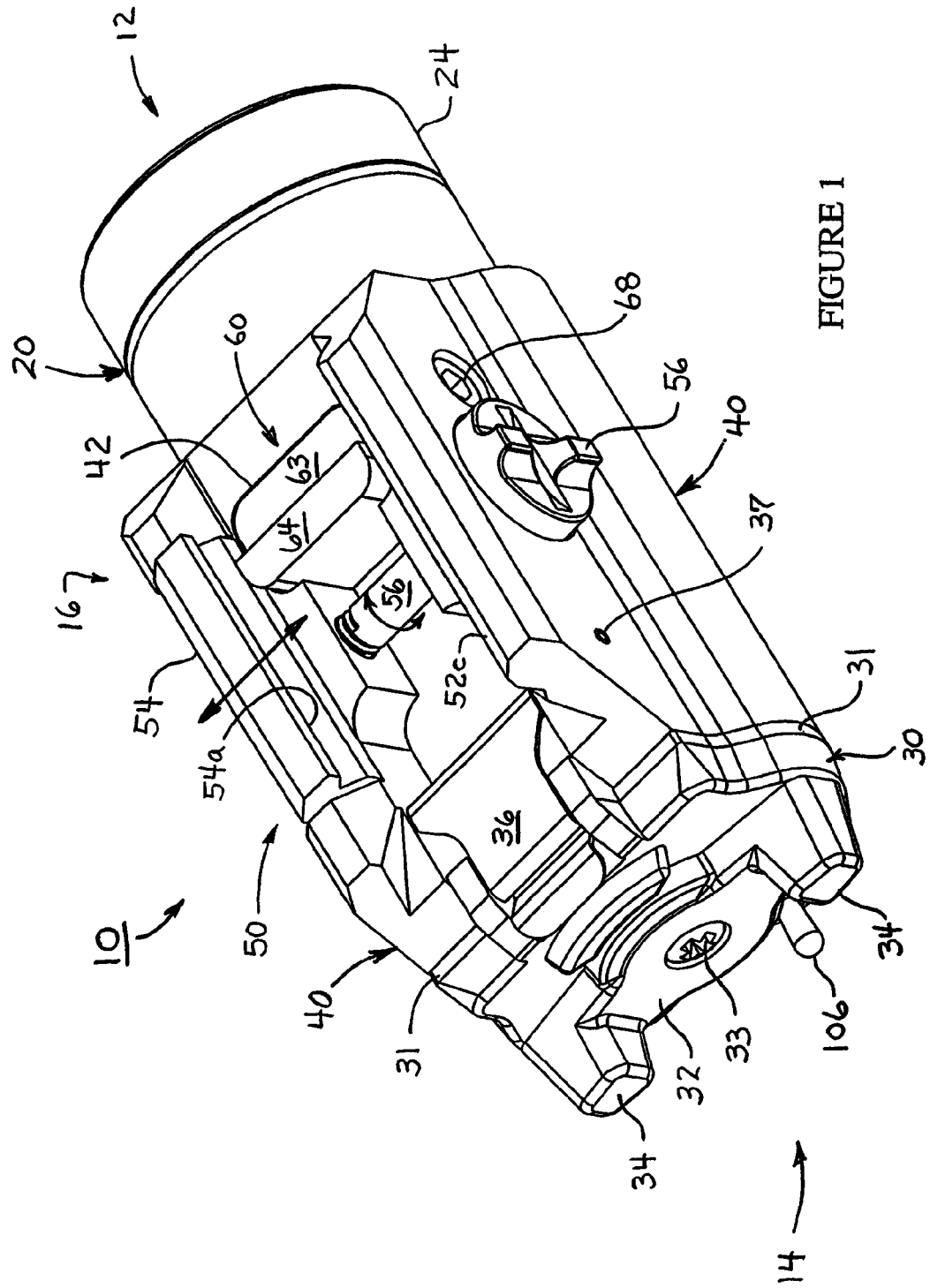
FIG. 1 is an isometric view of an example embodiment of a mountable light as described herein.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. It is noted that, according to common practice, the various features of the drawing are not to scale, and the dimensions of the various features are arbitrarily expanded or reduced for clarity.

DESCRIPTION OF THE PREFERRED EMBODIMENT

Figure 2A:
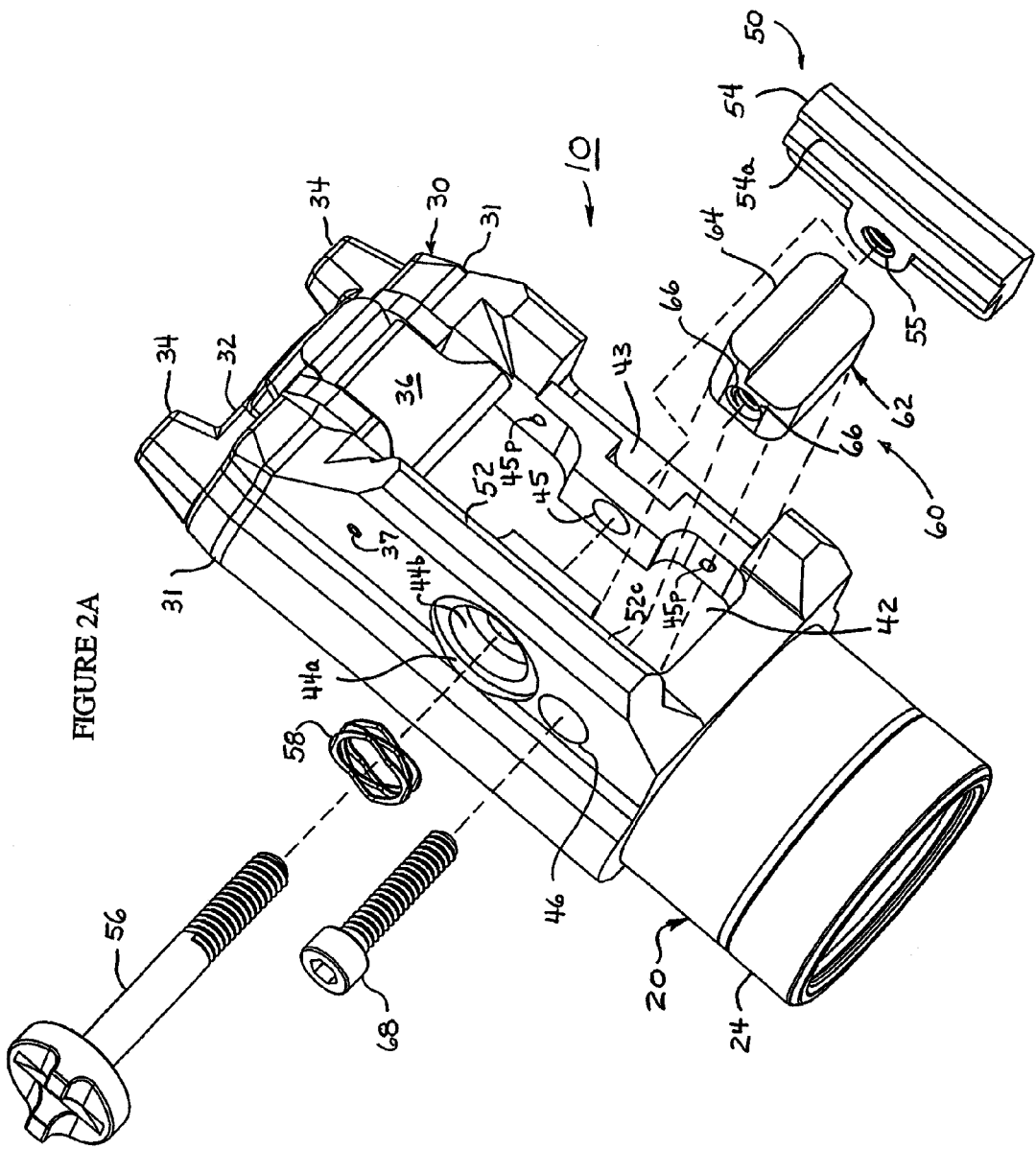
FIGS. 2A and 2B are exploded isometric views of the example embodiment of a mountable light of FIG. 1.
Figure 2B:
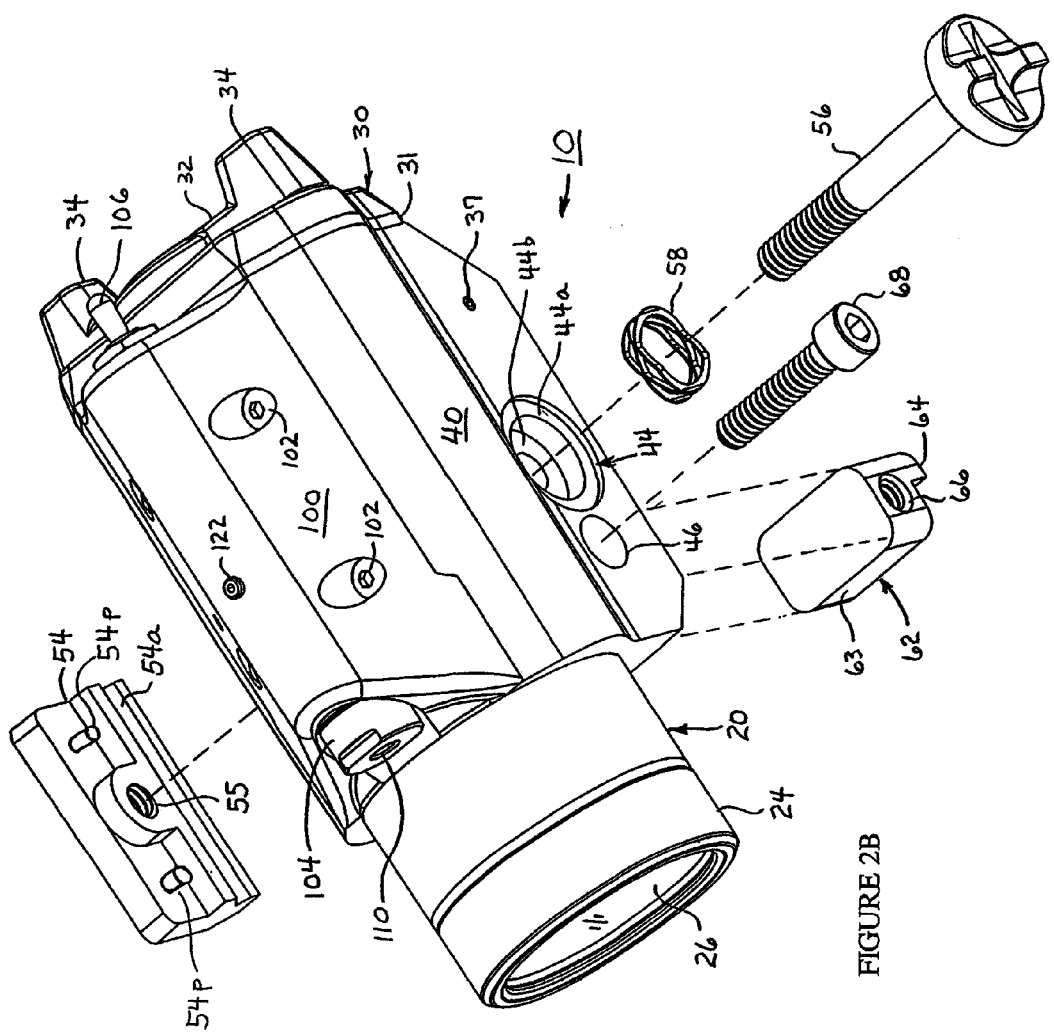
Figure 3:
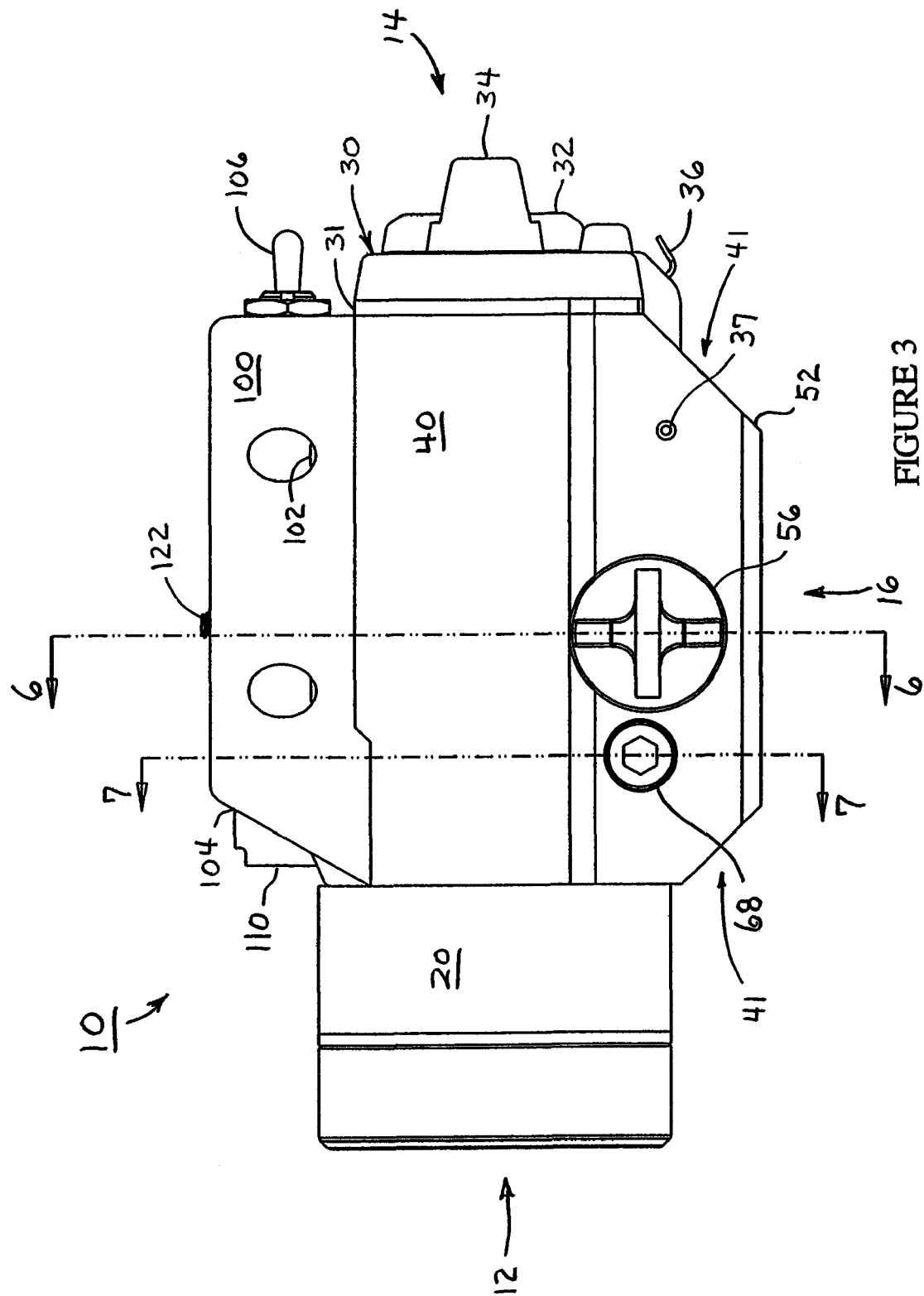
FIG. 3 is a side view of the example embodiment of a mountable light of FIGS. 1, 2A and 2B.
Figure 4:
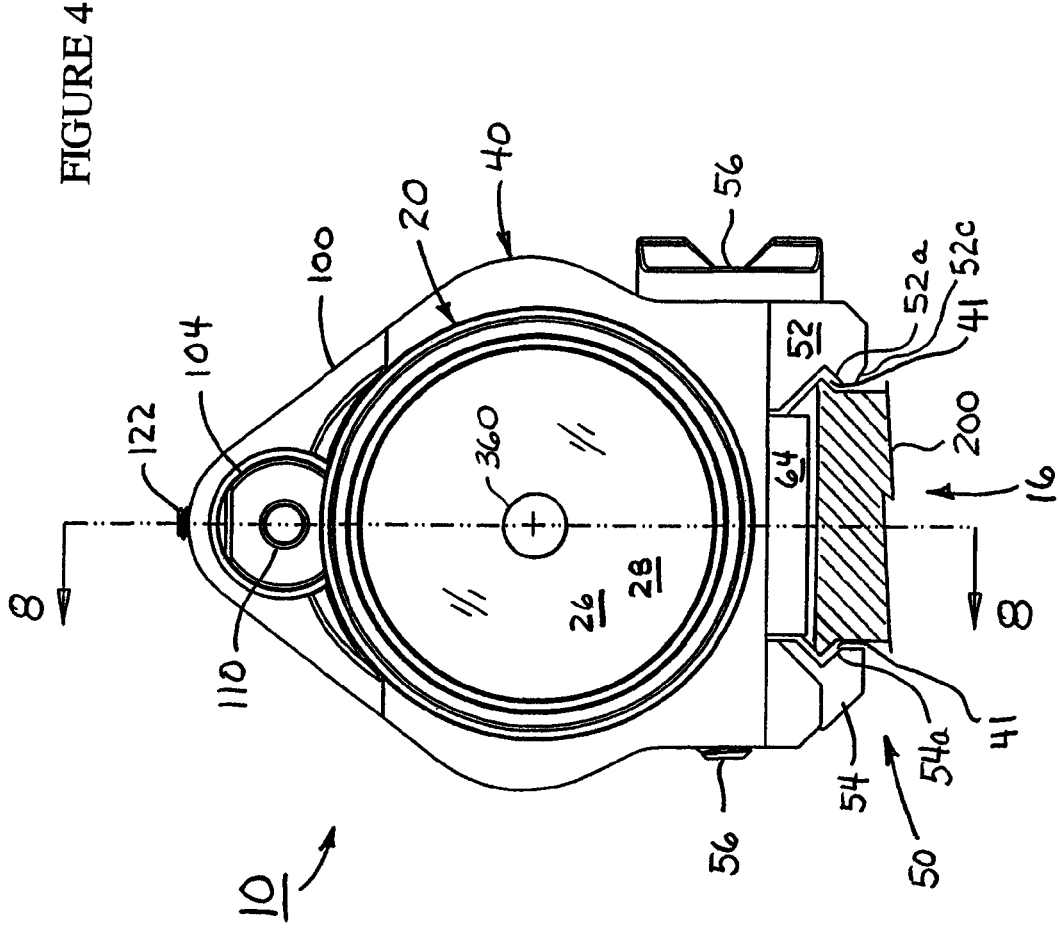
FIG. 4 is a view of the example embodiment of a mountable light of FIGS. 1-3 showing the light producing end thereof.
Figure 5:
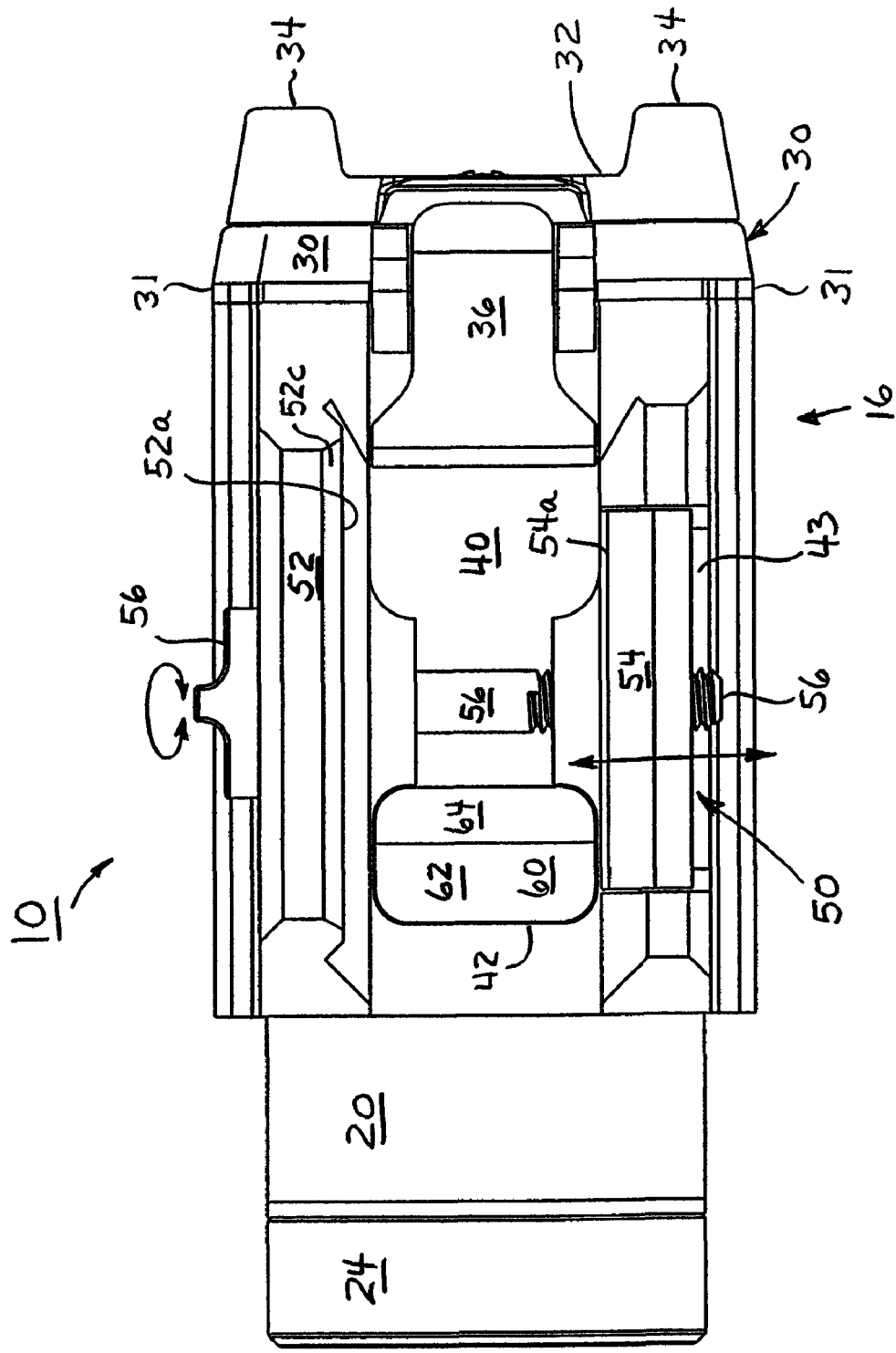
FIG. 5 is a view of the example embodiment of a mountable light of FIGS. 1-4 showing the mounting arrangement thereof.

FIG. 1 is an isometric view and FIGS. 2A and 2B are exploded isometric views of an example embodiment of a mountable light 10 as described herein, and FIGS. 3-5 are other external views of light 10. Light 10 will be described with reference to FIGS. 1-5 generally. Where a feature being described is not visible in one or more of FIGS. 1-5 or may be better seen in a particular FIGURE, reference may be made to the particular FIGURE.

Light 10 has a forward or head end 12 from which light is emitted when light 10 is activated and has a rearward or tail end 14 opposite head end 12. Tail end 14 includes, e.g., various switches and controls 32, 106, for controlling operation of the light sources of light 10. Light 10 further has a mounting face 16 whereat are the various arrangements for mounting light 10 to a mounting rail, e.g., a mounting rail 200 of a gun, an example of which is shown in and described in relation to FIG. 9. The direction between head end 12 and tail end 14 of light 10 may be referred to herein as "longitudinal" and a direction perpendicular thereto as "transverse." Thus, light can be said to be emitted from head end 12 of light 10 in or along the longitudinal direction or axis.

Light body 40 of light 10 is the principal structural member thereof, providing various structural features, openings and recesses adapted for the various mechanisms and electrical components and circuits that may comprise light 10.

Light 10 is mounted and secured to a mounting rail, e.g., a mounting rail 200 of a gun, by a clamping arrangement 50 and a keying arrangement 60 disposed on mounting face 16 of light body 40. Specifically, a longitudinal fixed clamp member 52 extends outwardly from light body 40 to provide a surface 52a against which a side rail 206 of a mounting rail 200 may bear. Opposing fixed clamp member 52 is movable clamp member 54 which is movable toward and away from fixed clamp member 52. Fixed clamp member 52 and movable clamp member 54 define a cavity or space 41 therebetween into which a mounting rail is placed for being engaged by clamp members 52, 54, e.g., by engaging respective faces 52a, 54a thereof. Cavity 41 is sometimes referred to as a rail guide cavity.

Specifically, movable clamp member 54 moves transversely (indicated by a straight double-ended arrow) in recess or channel 43 of light body 40 responsive to rotation of clamp screw 56 (indicated by an arcuate double-ended arrow). Clamp screw 56 is disposed through hole 44 which is through fixed clamp 52 and through a hole 45 coaxial therewith which is through a boss on light body 40 to engage a threaded hole 55 in and through movable clamp member 54. With a right hand thread, turning clamping screw 56 clockwise causes movable clamp member 54 to move transversely towards fixed clamp member 52, e.g., for engaging and clamping a mounting rail therebetween. Turning clamping screw 56 counterclockwise causes movable clamp member 54 to move away from fixed clamp member 52, e.g., to release a mounting rail therebetween. Clamping screw 56 may have a left hand thread, in which case the rotational directions would be reversed.

Wave spring 58 is disposed on the shank of clamp screw 56 and preferably is not attached either to screw 56 or to light body 40. Spring 58 is free to move along the shank of screw 56 and in counterbore 44b. Wave spring 58 biases movable clamp member 54 towards the clamping area so that light 10 may be "snapped" onto a mounting rail from the side, after which screw 56 may be tightened from the side of light 10. The bias provided by spring 58 may be overcome by pressing on the head of screw 56 to move screw 56 towards light body 40 thereby to move movable clamp member 54 away from fixed clamp member 52, thereby to aid in snapping light 10 onto a mounting rail.

To facilitate mounting light 10 in a snap-on, snap-off manner, fixed clamp member 52 may have a chamfer 52c along an edge thereof that contacts a mounting rail 200 for easing its movement with respect to a mounting rail 200, or movable clamp member 54 may have a similar chamfer along an edge thereof, or both fixed clamp member 52 and movable clamp member 54 may have respective chamfers along respective edges.

Preferably, hole 44 is counterbored for receiving wave spring 58 which, in addition to biasing clamp member 52 towards clamp member 54, tends to assist clamp screw 56 to resist turning without having to fully seat the head of screw 56 to the bottom of the counterbore of hole 44, however, screw 56 may be fully seated if desired. Preferably, hole 44 is double counterbored in that a smaller-diameter deeper counterbore 44b of sufficient diameter for receiving wave spring 58 is provided, and a larger-diameter shallower counterbore 44a is of sufficient diameter for receiving the head of clamp screw 56. The depth of smaller-diameter counterbore 44b beyond the depth of larger-diameter counterbore 44a is preferably greater than the fully compressed length of wave screw 58 so that the head of clamp screw 56 may be advanced into contact with the shoulder formed at the bottom of the larger-diameter counterbore 44a of hole 44. Thus, clamp screw 56 may be advanced to a point whereat movable clamp member 54 is biased toward fixed clamp member 52 by wave spring 58 or clamp screw 56 may be advanced further to make hard contact between clamp screw 56 and both of clamp members 52, 54.

Optionally, but preferably, movable clamp member 54 may have one or more posts 54p extending therefrom in a direction towards light body 40 and fixed clamp member 52 for extending into one or more corresponding holes 45*p* in light body 40 for maintaining a desired alignment of clamp member 54 with respect to light body 40. Posts 54*p* help maintain alignment of movable clamp member 54, for example, when movable clamp member 54 moves transversely toward or away from fixed clamp member 52 when clamp screw 56 is pressed or released, or when clamp screw 56 is rotated.

The arrangement of light 10 as illustrated in FIG. 1 has clamp screw 56 on the right side (e.g., as would be viewed by a user pointing the light away from himself) when the light is in a "clamp up" orientation, as would be convenient for attaching light 10 to a mounting rail on the underside of a weapon using the right hand. Light 10 may have a "mirror" or reversed arrangement of clamping arrangement 50 with respect to light body 40 wherein fixed clamp member 52 and clamp screw 56 are on the left side (opposite to that illustrated) so as to be convenient for attachment to an underside mounting rail with the left hand. In such mirror arrangement of clamp 50, clamp members 52, 54, and clamp screw 56, are on the opposite sides of light body 40 to that illustrated. Both arrangements of light 10 are desirable, because light 10 may be mounted to the underside or to the top side of an object, and because any given light 10 may be utilized with either the right hand or the left hand, depending upon the user and the circumstance.

As a result of this arrangement, light 10 may be tightly and accurately mounted to a mounting rail in a known, fixed and repeatable position, as is important, e.g., where light 10 is or includes an aiming light, such as a laser 110. In addition, where clamping screw 56 is not fully advanced and so movable clamp 54 is held against mounting rail 200 by the force of compressed wave spring 58, movable clamp member 54 may move outward sufficiently to release light 10 from mounting rail 200, thereby allowing for an easy snap-on snap-off mounting and demounting of light 10. In a preferable embodiment of clamp screw 56, the head thereof includes a slot suitable for receiving a coin or a screwdriver for tightening and loosening screw 56, as well a two raised projections to facilitate finger tightening and loosening.

Having clamp screw 56 (or a suitable fixed alternative) adjusted to an appropriate position will allow light 10 to be mounted and demounted using the snap-on and snap-off action afforded by movable clamp member 54 moving against the bias of spring 58, without having to adjust clamp screw 56 unless a tighter mounting is desired. The clamping action of clamp arrangement 50 when snapped onto a gun mounting rail has been found satisfactory in aiming and firing tests of certain guns, although tightening of clamp screw 56 for a more secure mounting may be desirable for high-powered weapons. Thus, a fixed pin or fixed screw may be utilized in place of screw 56 to provide a button pressable by the user for mounting and demounting light 10 as is now provided by the head of clamp screw 56. Having lights 10 with clamps 50 both in non-mirror and mirror arrangements would allow ease of use for both topside and underside mounting, as well as for right-handed and left-handed users.

Mounting arrangement 50 allows a light 10 or another object utilizing mounting arrangement 50 to be mounted and demounted from a weapon (or a tool, implement or other object) from the side thereof, whether the light 10 or object is snapped on and off or whether clamp screw 56 is pressed as a button or is rotated. This is an advantageous safety feature because mounting and demounting can be accomplished with one hand and without the user having to place any part of his body in front of the muzzle of the weapon.

Clamping arrangement 50 is effective for securing light 10 with respect to both transverse and longitudinal movement. Additional resistance to longitudinal movement, e.g., as might result from an extreme mechanical disturbance or force, as in a discharge of a high-power firearm, may be provided. Keying arrangement 60 is provided for resisting longitudinal movement of light 10 along a mounting rail. Keying arrangement 60 includes a key member 62 removably disposed in a key recess 42 of light body 40. Key member 62 preferably includes a body 63 of similar size and shape to key recess 42 so as to be receivable therein in a suitable position and with suitable tolerance. Key member 62 has a keying feature 64 extending from key body 63, and keying feature 64 is of a size and shape, and in a position, for engaging a corresponding keying feature in the mounting rail to which light 10 will be mounted.

Because the mounting rails of various guns, tools and other objects to which light 10 may be mounted can have different configurations, key member 62 is selected to have a keying feature of corresponding size and shape and position to the keying feature of the mounting rail. Thus, a number of different key members 62 may be available so that light 10 may be mounted to mounting rails of different configurations. Key members 62 may be interchangeable and replaceable where the size and shape of keying body 63 and key recess 42 are predetermined and standardized, as is preferred. Such key members 62 may be made available individually or in sets, or both, and may be provided with a light or as an accessory or option.

Key member 62 is secured in key recess 42 by key screw 68 which is disposed through hole 46 of light body 40 and threaded into threaded hole 66 of key member 62. Key member 62 is replaceable by removing key screw 68 and then removing key member 62 from key recess 42, and a replacement key member 62 is installed by placing the key body 63 thereof in key recess 42, inserting key screw 68 through hole 46 and into threaded hole 66, and tightening key screw 68. Key screw 68 is preferably disposed transversely through light body 40 to engage key member 62.

Because the position of key 62 with respect to light 10, and specifically with respect to fixed clamp member 52 and movable clamp member 54, is predetermined because the location of key recess 42 of light body 40 is predetermined, the position of key 64 is also predetermined when key member 62 is disposed in key recess 42. Thus, a key member 62 may be particularly adapted for a particular mounting rail configuration by properly determining the length and width of key 64, the height of key 64 above key member body 63, and the position of key 64 on key member body 63.

Because the dimensions and configurations of the various mounting rail configurations are known, key members 62 properly configured to engage each configuration of mounting rail may be provided. If light 10 is to be mounted, for example, to a mounting rail 200 (FIG. 9) having a transverse slot or groove 208 therein, then a key member having a projecting generally rectangular transverse key 64 as illustrated is satisfactory. The particular shape of key 64 may be less important so long as the faces of key 64 that engage the keying feature of the mounting rail (e.g., parallel opposing faces of key 64 that engage the sides of a slot 208 in a mounting rail 200) are of suitable size and spacing. For example, where a keying slot 208 extends the full width of a mounting rail 200, a corresponding key 64 may be substantially shorter than the length of slot 208. Key 64 may be rectangular, square, cylindrical, circular, or any other shape corresponding to the shape of the keying feature of a mounting rail, or at least the operative surfaces thereof.

As a result, light 10 may be tightly and accurately mounted to a mounting rail in a known, fixed and repeatable position, both longitudinally and transversely, as is important, e.g., where light 10 is or includes an aiming light, such as a laser 110, or a sight.

Figure 8:
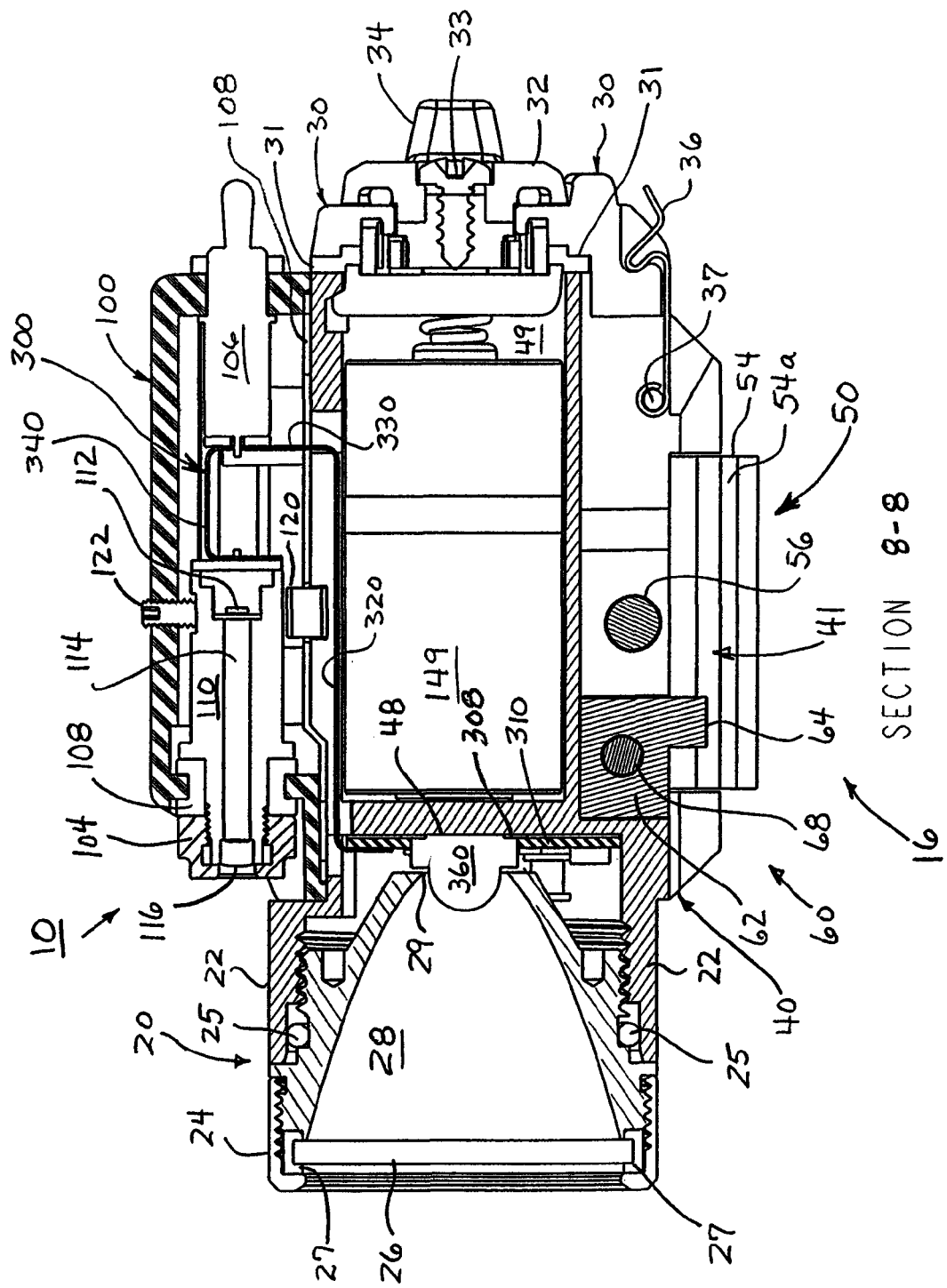
FIG. 8 is a sectional view of the example embodiment of a mountable light of FIGS. 1-5 taken at section 8-8 thereof.

Head 20 of light 10 is at the head end 12 thereof and includes the various elements relating to providing the light beam emitted by light 10. Referring to FIG. 8, for example, head 20 includes a head body 22 and a face cap 24 threaded thereon. Lens 26 is held in face cap 24 and is cushioned by a resilient gasket 27 that absorbs shock, e.g., shock generated when a gun to which light 10 is mounted is fired.

Reflector 28 is threaded into head body 22 and provides shaping and focusing of the light produced by light source 360 when light source 360 is energized for producing light. Reflector 28 has an opening 29 at the rearward end thereof into which light source 360 extends. The threaded interface between reflector 28 and head body 22 may be sealed, e.g., by a seal or gasket, such as O-ring 25, so as to resist entry of moisture and other undesirable substances. The interface between face cap 24 and lens 26 is similarly sealed by shock absorbing gasket 27.

Cover 30 is at the rearward end 14 of light 10 and light body 40 and covers the open end of a battery compartment 49 of light body 40. Cover 30 provides access to battery cavity or compartment 49 within light body 40 wherein are disposed batteries 149, as may be seen in FIGS. 6, 7 and 8. Batteries 149 are for providing electrical energy for operating light source 360 and/or laser 110 of light 10. Contacts that receive the positive and negative terminals of batteries 149 may include raised portions and recessed portions that allow batteries 149 to be connected only in the correct polarity.

Cover 30 is urged against light body 40 and held thereagainst by hinged latch 36 which is hinged on hinge pin 37 which passes through two opposing coaxial holes in body 40. Latch 36 snaps onto and off of a ridge of cover 30 to respectively secure and release cover 30 from light body 40. Cover 30 is sealed by gasket 31 under compression from the action of latch 36 to resist, e.g., entry of moisture into the interior of light body 40.

In the example illustrated, cover 30 includes a switch actuator 32 that serves as an ON/OFF actuator for the light source of light 10. Switch actuator 32 has two paddles 34 that extend rearwardly against which a user may press to cause switch actuator 32 to rotate in the clockwise or counterclockwise direction about the longitudinal axis of light 10 for actuating and deactuating light 10. One of paddles 34 usually tends to be more convenient for a left handed user and the other for a right handed user, irrespective of the mounting orientation of light 10 on a gun. Actuator 32 is held in place by screw 33 about which it is rotatable, e.g., as may be seen in FIG. 8.

Laser housing 100 is disposed on light body 40 and is typically secured thereon by screws 102. Gasket 108 between housing 100 and body 40 provides resistance to entry of moisture and other undesirable substances. Laser cartridge 110 includes a laser source 112, a laser light tube 114 and a laser lens 116 therein for directing a beam of laser light longitudinally in the same direction as the light from head 20, as may be appreciated from FIG. 8. Laser cartridge 110 is held in laser housing 100 by collar 104 bearing against a rubber grommet 108. Mode selector switch 106 is disposed at the rear of laser housing 100 where the toggle handle thereof is convenient for operation by a user for selecting among various modes, e.g., a laser-only mode, a light-only illumination mode, a both laser and illuminating light mode, and a neither laser nor illuminating light mode, i.e. an OFF mode.

Because laser 110 is utilized as an aid to aiming of the firearm on which light 10 including laser 110 is mounted, alignment or bore-sighting of laser cartridge 112 relative to the line of fire of the firearm is desirable. To this end, aiming set screws 122, 124 are provided for respectively adjusting elevation and windage. The position of laser cartridge 110 in housing 100 may be adjusted by means of aiming adjustment screws 122, 124 for boresighting a firearm having light 10 mounted thereon by mounting arrangement 50.

Figure 6:
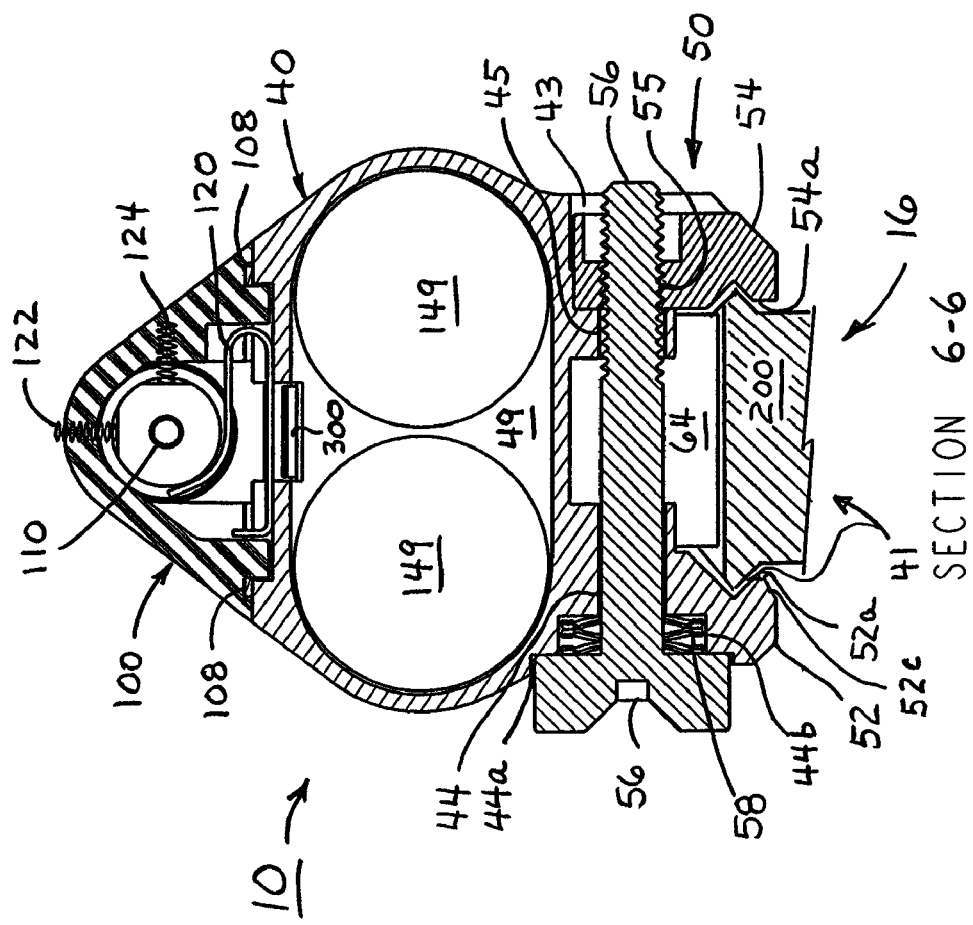
FIG. 6 is a sectional view of the example embodiment of a mountable light of FIGS. 1-5 taken at section 6-6 thereof.
Figure 7:
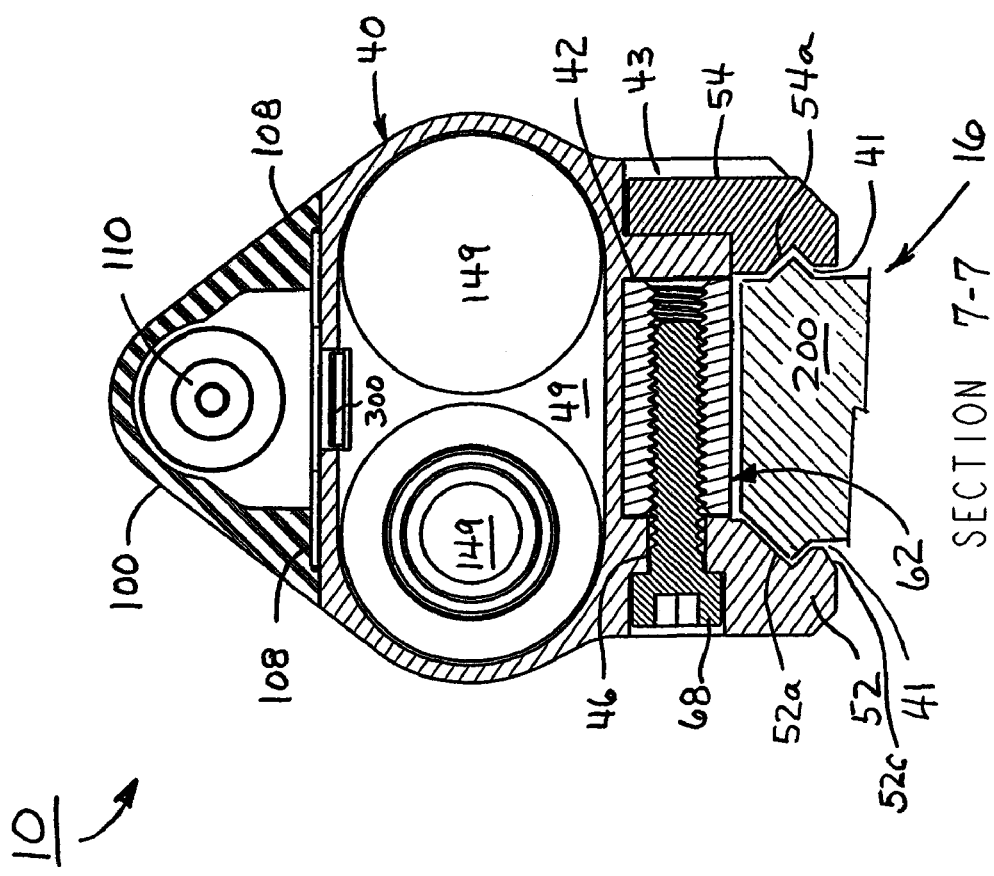
FIG. 7 is a sectional view of the example embodiment of a mountable light of FIGS. 1-5 taken at section 7-7 thereof.

Specifically, laser cartridge 110 is urged toward housing 100 by spring 120, e.g., generally upward and rightward as seen in the view of FIG. 6, and the bias provided by spring 120 may be counteracted by aiming adjusting screws 122, 124. Spring 120 may be a leaf spring 120 as illustrated, or may be a coil spring, a conical spring, or any other spring, as may be desired. The rearward end of laser cartridge is able to be moved by elevation adjustment screw 122 and by windage adjustment screw 124 because laser cartridge 110 is supported at its forward end by a resilient or rubber gasket 108 that engages a circular flange on housing 100 and is compressed between collar 104 and a shoulder on laser cartridge 110. Grommet 108 is resilient which allows laser cartridge to be moved relative to laser housing 100 in response to advancing and withdrawing elevation and windage adjustment screws 122, 124.

It is noted that laser housing 100 and laser cartridge 110 may be omitted, i.e., may be an optional feature, in which case a cover would replace laser housing 100 on light body 40. Head 20, cover 30, light body 40, and laser housing 100 may be of the same or of different materials, such as nylon, plastic or metal, such as an aircraft-grade aluminum, and the various screws, e.g., screws 33, 56, 68, 102, may be of steel or other suitable material. Where body 40 and/or housing 100 are of nylon or plastic, metal inserts may be utilized in the holes therein to increase the resistance of the various holes to stripping by the screws that are threaded therein. Lens 26 may be of a plastic, such as polycarbonate, or a glass. In a preferred example embodiment, light source 360 is a three-watt Luxeon light-emitting diode available from Lumileds Lighting LLC, located in San Jose, Calif., laser cartridge 110 may be a visible or infrared laser available from Sanyo Semiconductor Corporation, located in Allendale, N.J., and light 10 may be powered by lithium batteries 149.

Figure 9:
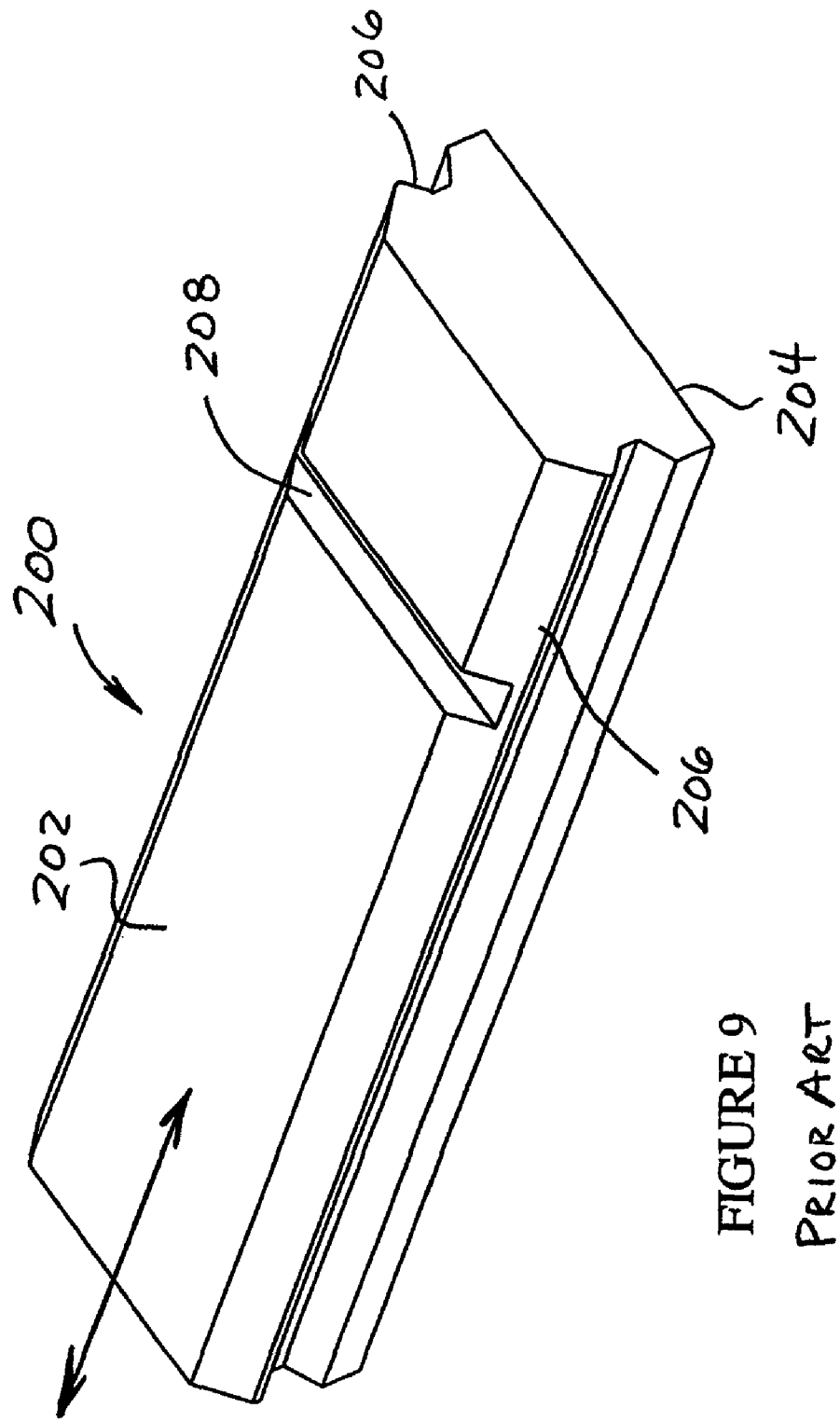
FIG. 9 is an isometric view of an example prior art mounting rail to which the example embodiment of a mountable light of FIGS. 1-5 may be mounted.

FIG. 9 is an isometric view of an example prior art mounting rail 200 to which the example embodiment of a mountable light 10 of FIGS. 1-5 may be mounted. Other mounting rails of different configuration may be provided, and may be of different size and/or shape and/or mounting arrangement, although certain "standard" mounting rails, such as the so-called Piccatinny rail configuration, may have become somewhat of a "standard," although many mounting rails purported to conform to one "standard" or another differ in dimension and/or tolerance from the supposed "standard.".

Example mounting rail 200 has a "top" surface 202 that is exposed when rail 200 is mounted to a gun, tool or other object, wherein the "bottom" surface 204 is against the gun, tool or other object. Surfaces 206 define opposing longitudinal sides of mounting rail 200 along which an object mounted thereon, such as a conventional light, may be slid on and off, e.g., in the longitudinal direction indicated by the double-ended arrow, or may be clamped over. The light 10 of the present arrangement can not slide onto rail 200 because keying member 60 thereof will interfere with rail 200 and prevent a sliding on. As a result, light 10 is mounted to rail 200 other than from the end thereof wherein a user's hand might be placed in front of the muzzle of a weapon, and so the keying feature 60 inherently provides a safety feature that leads a user to mount a light 10 from the side of mounting rail 200, e.g., so that keying feature 64 engages slot 208 of mounting rail 200.

Mounting rail 200 has a keying feature 208 to which the object mounted thereon keys or latches as it is slid onto or mounted on rail 200 so as to be held positively in place longitudinally. Keying feature 208 may typically be a slot 208. The object, e.g., a light, if of the slide-on type typically has a button or other release for disengaging from slot 208 for removal of the object from mounting rail 200.

Mounting rails 200 provided on different firearms, e.g., guns of different manufacturers and different types of guns of the same manufacturer, tend to be of different sizes and shapes, as do the rails 204 and keying features 208 thereof. Even mounting rails 200 purporting to conform to a particular standard mounting configuration may have significant dimensional and tolerance differences. In particular, keying features 208 of different mounting rails 200 may be of different size and different shape, and may be located at different locations on mounting rail 200. This results in the need for different lights and/or different mounting devices to mount on different guns and the like, as set forth in the introduction hereof, i.e. one problem addressed by the light described herein.

FIG. 10 is a view of the side of another example embodiment of a mountable light 10', FIG. 11 is a view of the top of the example embodiment of a mountable light 10' of FIG. 10 showing the mounting arrangement 50 thereof, FIG. 12 is an exploded isometric view of the example embodiment of a mountable light 10' of FIGS. 10 and 11, and FIG. 13 is a sectional view of the example embodiment of a mountable light 10' of FIGS. 10-12 taken at section 13-13 of FIG. 10. Light 10' will be described with reference to FIGS. 10-13 generally. Where a feature being described is not visible in one or more of FIGS. 10-13 or may be better seen in a particular FIGURE, reference may be made to the particular FIGURE.

Light 10' is generally similar to light 10 in most respects, and so the description of light 10 herein above also generally applies to light 10'. Light 10' differs from light 10 in that optional laser 110 and laser housing 100 are not provided, so that light 10' provides illumination from the light source housed in head 20' which is operated, e.g., turned ON momentarily, turned ON continuously and turned OFF, by operation of switch actuator 32 located on cover 30' similarly to that described above for cover 30. The arrangement of the LED light source, reflector, battery cavity, and connecting circuitry, within face cap 24' of head 20' and within light body 40' of light 10' may also be generally similar to that described above in relation to light 10, and another example arrangement is described below. Similarly, clamping arrangement 50 of light 10' may be of generally similar arrangement and function to that described above in relation to light 10, as illustrated, but may differ in certain aspects, e.g., in size and shape, so that light 10' may be smaller than light 10.

Cover 30' is at the tail or rearward end 14 of light 10' and light body 40' and covers the open end of light body 40'. Battery 149 is for providing electrical energy for operating light source of light 10'. Contacts that receive the positive and negative terminals of battery 149 may include raised portions and recessed portions that allow battery 149 to be connected only in the correct polarity. Cover 30' is secured rear end of light body 40', e.g., by a force fit, by snap fit, by a clip or other fastener, by adhesive, by welding, or by other suitable means. Cover 30' has an extension 400 that extends into the interior of body 40', and may define a cavity 405 for receiving a battery and may support a circuit board 440, as described below.

In the example illustrated, cover 30' includes a switch actuator 32 that serves as an ON/OFF actuator for the light source of light 10'. Switch actuator 32 has two paddles 34 that extend rearwardly against which a user may press to cause switch actuator 32 to rotate in the clockwise or counterclockwise direction about the longitudinal axis of light 10' for activating and deactivating light 10'. One of paddles 34 usually tends to be more convenient for a left handed user and the other for a right handed user, irrespective of the mounting orientation of light 10' on a gun. Actuator 32 is held in place by screw 33 about which it is rotatable, e.g., as may be seen in FIG. 15B.

Interchangeable keying arrangement 60' is located on light body 40' generally between fixed clamp member 52 and movable clamp member 54. Recess 42' in light body 40' provides a recess into which a key 62' may be placed in a predetermined position, similarly to recess 42 of light body 40 described above. Recess 42' need not be of the same size and shape as key 62' so as to locate key 62' in a particular position, but may be a channel 42' the side walls of which position key 62' centrally with respect to the transverse direction of light 10' along the longitudinal direction thereof. In that instance, as shown for light body 40', key 62' may be located in a predetermined position longitudinally by clamp screw 56 which has a shaft that passes through a transverse hole in key 62'.

Clamp screw 56 may have a circumferential groove 56G or a hole at the threaded end thereof opposite its head for receiving an optional removable means 57 for retaining clamp screw 56 with clamping arrangement 50, e.g., for preventing unintended removal (un-threading) of clamp screw 56 from clamping arrangement 50. Such removable means 57 may include, e.g., an "E"-shaped snap-on, snap-off locking clip which is installed on the end of the shaft of clamp screw 56 after clamp screw 56 is threaded through hole 55 of movable clamp member 54. Optional E-clip 57 when in place prevents clamp screw 56 from being removed (un-threaded) from movable clamp member 54, at least without removing removable E-clip 57, so that the clamping arrangement 52, 54, 56 does not come apart unexpectedly. Desirably, an insertion tool for the e-clip 57 may be provided with the light 10' for facilitating the installation and removal of E-clip 57. Means 57 may include various members, e.g., a pin, cotter pin, or wire that passes through a hole at the end of the shaft of clamp screw 56, a locknut, a clip, a split ring, or any other member that retains clamp screw 56 with clamping arrangement 50, e.g., by preventing the end of clamp screw 56 from being un-screwed through hole 55 of clamp member 54.

Head 20', light body 40', and key 60' may be of the same or of different materials, such as nylon, plastic, or metal, and the various screws, e.g., screw 56, may be of steel or other suitable material. For example, head 20', light body 40', movable clamp 54 and keys 60' may be of metal, such as aluminum or aircraft grade aluminum, or plastic. Where body 40' is of nylon or plastic, metal inserts may be utilized therein to increase the resistance of the various holes to stripping. Head 20' may include a lens that may be of a plastic, such as polycarbonate, or a glass, in addition to a reflector. In a preferred example embodiment, light 10' utilizes an LED light source that includes a light-emitting diode available from Cree, Inc. located in Durham, N.C., and is powered by a 3-volt lithium battery that may be inserted and removed from head end 12 of light 10', e.g., when head 20' is un-threaded and separated from body 40'.

Figure 14:
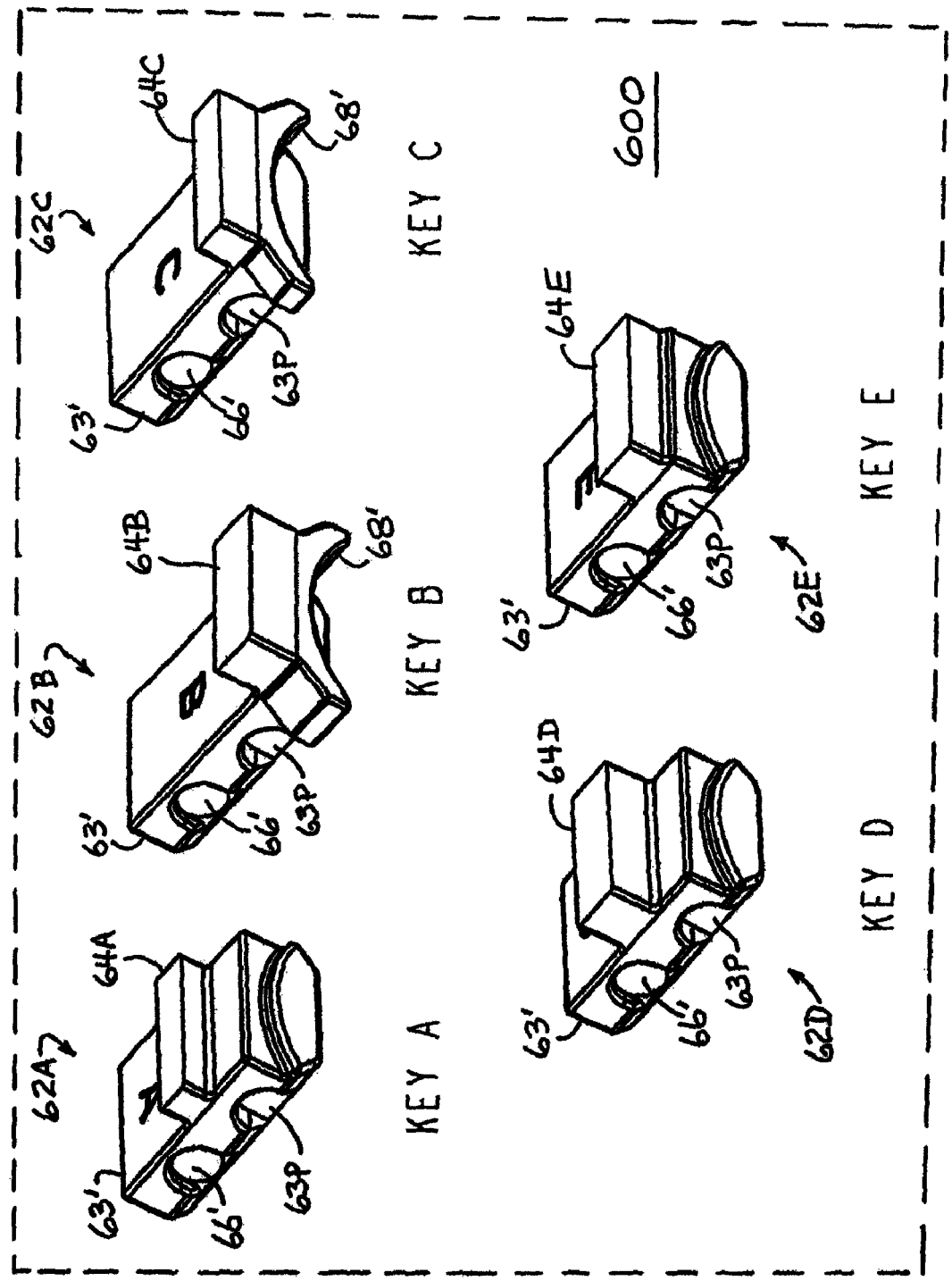
FIG. 14 is an isometric view of an example set of keying members usable with the example light of FIGS. 10-12.

FIG. 14 is an isometric view of an example set 600 of keying members 62A-62E that are usable with the example light 10' of FIGS. 10-12. Each of example keying members 62A-62E has a key body 63' of substantially the same shape and size for being disposed in the key recess 42' of light body 40' that is between fixed clamp member 52 and movable clamp member 54. The shapes of key body 63' and key recess 42' are complementary so that each of example keying members 62A-62E will fit well into keying recess 42', e.g., so as to be receivable therein in a suitable position and with suitable tolerance.

Key body 63' of each of example keying members 62A-62E has a transverse hole 66' therethrough through which clamp screw 56 passes when a keying member 62A-62E is disposed in recess 42' of body 40' thereby to secure keying member 62A-62E in key recess 42'. Transverse hole 66' may be a smooth bore hole because the shaft of clamp screw 56 (which typically is smooth) resides therein while the threaded end of clamp screw 65 engages the threaded hole 55 in movable clamp member 54. While example set 600 is shown as comprising five keying members 62A-62E, a set 600 of keying members 62' may comprise a greater number of keying members or a lesser number of keying members 62' as may be appropriate for the number of different mounting rails 200 to which mountable light 10' is intended to mount. Key body 63' may have a recess or a hole 63P therein for receiving post 54P when movable clamp member 54 is brought close to fixed clamp member 52 sufficiently for posts 54P to extend into and through holes 45P of body 40'.

Key member 62' has a keying feature 64 extending from key body 63', and keying feature 64 is of a size and shape, and in a position, for engaging a corresponding keying feature in the mounting rail to which light 10 will be mounted. While illustrated as a projection 64 that would fit into a recess 208 of a mounting rail 200, the keying feature of key members 62' may be recesses for engaging corresponding projections of a mounting rail 200. Different ones of keying members 62A-62E have different keying features, e.g., projections, of different sizes and shapes and in different locations, so as to correspond to the size, shape and location of the complementary keying features of different mounting rails, however, all of keying members 62A-62E have respective key bodies 63' that have the same predetermined width with transverse hole 66' located at the same predetermined distance from the forward end of bodies 63A-63E.

For example, example key 62A has a keying feature comprising transverse rectangular projection 64A that is of relatively narrower width and relatively lower height located relatively centrally between the forward and rearward ends of key body 63' thereof, while example key 62D has a keying feature comprising transverse rectangular projection 64D that is of relatively wider width and relatively higher height located relatively centrally between the forward and rearward ends of key body 63' thereof, and while example key 62E has a keying feature comprising transverse rectangular projection 64E that is of relatively wider width and relatively intermediate height located relatively closer to the forward end of key body 63' thereof. Each of projections 64A, 64D, 64E has a length that is the same as the predetermined width of key bodies 63'.

By way of further example, example key 62B has a keying feature comprising transverse rectangular projection 64B that is of relatively intermediate width and relatively higher height located relatively beyond the forward end of key body 63' thereof, while example key 62C has a keying feature comprising transverse rectangular projection 64C that is of relatively narrow width and relatively intermediate height located relatively beyond the forward end of key body 63' thereof. Each of projections 64B, 64C has a length that is the same as the predetermined width of key bodies 63'.

Certain ones of keying members 62A-62E, in particular, example keying members 62B and 62C that have keying features 64B and 64C that are located at and/or extend in whole or in part beyond the forward end of key body 63', have body extensions 68' at the forward end of key body 63', for providing additional support for keying features 64B and 64C. Body extensions 68' are disposed adjacent to head 20' of light 10' and are not disposed in recess 42' as are bodies 63'. Preferably, body extensions 68' have a concave arcuate, e.g., circular, shape so as to conform to the convex arcuate, e.g., circular, shape of the exterior of head 20'. It is noted that keys having an arcuate body extension 68' are located in recess/channel 42' by the opposing ends of arcuate extensions 68' engaging the forward ends of the portions of light body 40' that define fixed clamp member 52 and that define a support for movable clamp member 54, in addition to being located in channel 42' by clamp screw 56, e.g., by the shaft thereof, passing there through.

As a result, all of the different keys of key set 600 are interchangeable, and each and any key of a set of keys 600 may be placed into key recess 42' of body 40' of mountable light 10' and secured therein by clamp screw 56 passing through transverse hole 66' thereby permitting light 10' to be utilized with different mounting rails 200. Thus, it is only necessary for a user of mountable light 10' to have a set 600 of relatively inexpensive interchangeable key members in order to use the same light 10' with a plurality of different mounting rails of different objects, e.g., mounting rails for different weapons or other objects, rather than having to obtain a number of different and relatively expensive lights.

FIG. 15A is an exploded side view and FIG. 15B is an exploded isometric view about 180° around showing an example internal arrangement of the example embodiment of a mountable light 10' of FIGS. 10 and 11, without face cap 24' and without light body 40'. In the internal arrangement of light 10', cover 30' supports an extension 400 that supports an electronic circuit board 440 on which may be provided electrical and electronic components 444 of a circuit that controls operation of the light source in head 20'. Electronic circuit board 440 is mounted to extension 400 in a position wherein it is proximate the interior surface of the wall of light body 40' that is distal from clamping arrangement 50 thereof.

Extension 400 is preferably of a "U-shaped" cross-section that defines an internal cavity 405 for receiving a source of electrical power, e.g., battery 149, therein. Battery 149 may have terminals at its opposing ends that, when battery 149 is disposed in cavity 405, one battery terminal thereof, e.g., the positive terminal, makes electrical contact with a terminal located adjacent to cover 30', and the other battery terminal thereof, e.g., the negative terminal, makes electrical contact with spring terminal 510 extending rearwardly from reflector 28'. The terminal adjacent to cover 30' may provide an electrical connection between the rearward terminal of battery 149 and circuit board 440, preferably via the switch 32 of cover 30'. Preferably, the terminal adjacent to cover 30' is configured so as to only make electrical connection with a terminal of battery 149 when battery 149 is disposed in cavity 405 in the proper orientation, e.g., with its positive terminal towards cover 30'.

In one preferred arrangement, contacts 420, 430 are aligned and positioned by being disposed in respective substantially parallel longitudinal grooves in extension 400 and by their respective tabs 422, 432 being soldered to circuit board 440. Circuit board 440 is aligned and positioned relative to extension 400 by posts 402 thereof that extend into corresponding holes 442 of circuit board 400. Once contacts 420, 430 are assembled with circuit board 440 and circuit board 440 is assembled onto extension 400, extension 400 is assembled to cover 30'. Cover 30' with extension 400 and circuit board 440 assembled thereto is then assembled with light body 40', e.g., to form a substantially permanently assembled light 10'. The assembled parts 30', 40', 400, 420, 430, 440 may be retained together by friction, snap-in retention, thermal staking, thermal welding, adhesives, fasteners, or other suitable securing means.

Reflector 28' comprises an assembly that includes electrical terminals 510, 520, 530 on the rearward end thereof for making electrical connection with battery 149 and with contacts 420, 430, e.g., leaf spring contacts, that extend in a forward direction from the front end of extension 400. Reflector 28' has external threads thereon that thread into internal threads of face cap 24'. When assembled into light 10', cover 30' is adjacent the rear opening of light body 40' and extension 400 extends into the interior thereof. Battery 149 is disposed in cavity 405 and reflector 28' is proximate to extension 400 so that spring contact 510 makes electrical connection to one end of battery 149, circular contact 520 makes electrical connection with spring contact 420, and circular contact 530 makes an electrical connection with spring contact 430.

Thus, head 20' serves as a battery compartment cover that may be unscrewed from the front of light body 40' to install and/or access battery 149 in battery compartment 405, for initial placement and/or subsequent replacement, and may be screwed onto light body 40' for closing battery compartment 405. To this end, head 20' desirably includes three concentric electrical contacts 510, 520, 530 for making necessary connections between battery 149, LED 360 and circuit board 440, and contacts 510-530 are concentric with the threaded ends of face cap 24' and of reflector 28'. Cover 30', being relatively permanently attached to light body 40', need not have a hinge pin and closure clip to secure it in a closed position, and the complexity thereof, and cover 30' cannot be removed and misplaced.

In one example embodiment, battery 149 is a three-volt lithium battery and circuit board 440 includes an electronic voltage boosting circuit, e.g., including an input inductor, an ON/OFF switching transistor to ground, a diode to the output and an output capacitor, that increases the voltage provided by battery 149 to a voltage sufficient to operate an LED light source 360, e.g., 2.4-2.8 volts, at a desired brightness, even though battery 149 may discharge to a lower voltage. In addition, the example circuit may also include a current regulating circuit that controls the magnitude of the current flowing through LED light source 360 to one or more predetermined values that are selected to produce one or more desired levels of light output. Preferably, such current regulating circuit directly senses the current flowing in LED 360, e.g., using a series resistor and an amplifier, for providing a feedback signal to the controller for the ON/OFF switching transistor to control the repetition frequency and/or pulse width of the ON/OFF cycling of the switching transistor, thereby to control the output of the voltage boosting circuit and the current flowing in LED 360.

Figure 17:
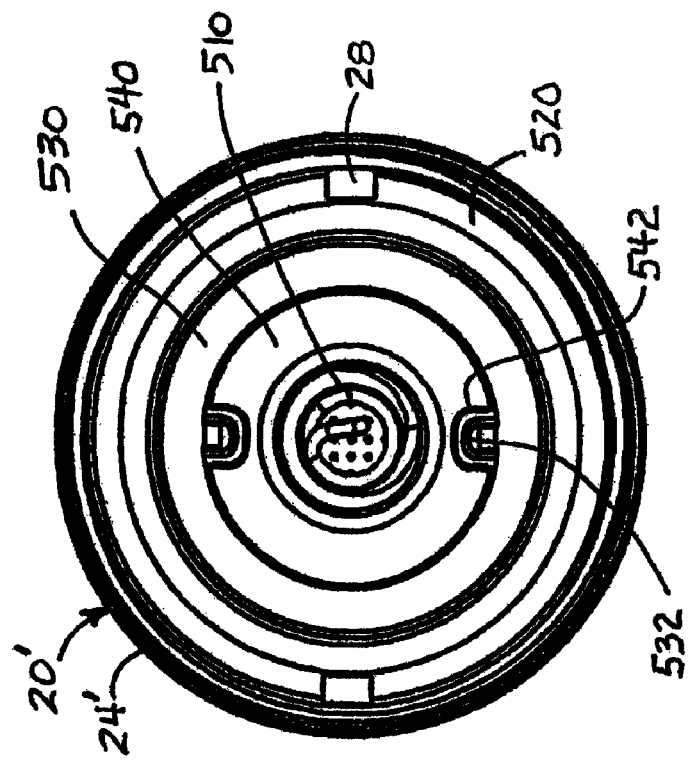
FIG. 17 is an end view of the example head assembly of FIG. 16.
Figure 16:
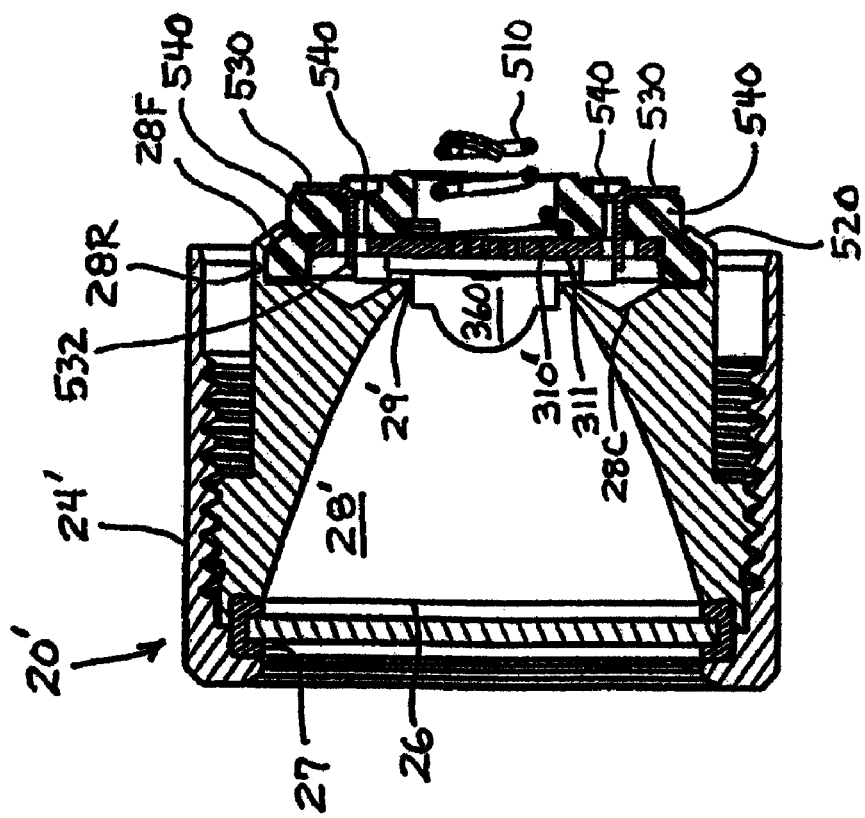
FIG. 16 is a sectional view of an example head assembly of the example embodiment of a mountable light of FIGS. 10-12.

FIG. 16 is a sectional view of an example head assembly 20' of the example embodiment of a mountable light of FIGS. 10-12; and FIG. 17 is an end view of the example head assembly 20' of FIG. 16. Head 20' of light 10' is at the head end 12 thereof and includes the various elements relating to providing the light beam emitted by light 10'. Head 20' includes a face cap 24' into which reflector 28' is threaded to hold lens 26 in face cap 24' where it is cushioned by a resilient gasket 27 that absorbs shock, e.g., shock generated when a gun to which light 10' is mounted is fired.

Reflector 28' is threaded into face cap 24' and provides shaping and focusing of the light produced by light source 360 when light source 360 is energized for producing light. Reflector 28' has an opening 29' at the rearward end thereof into which light source 360 extends. The threaded interface between reflector 28' and face cap 24' may be sealed, e.g., by a seal or gasket, such as gasket 27, and the interface between face cap 24' and light body 40' may be sealed, e.g., by a seal or gasket or an O-ring, so as to resist entry of moisture and other undesirable substances. The interface between face cap 24' and lens 26 is similarly sealed by shock absorbing gasket 27. Reflector 28' may have a pair or more of wrenching recesses 28W into which a tool may be inserted for tightening reflector 28' into face cap 24' or for loosening reflector 28' from face cap 24'.

Reflector 28' is part of an assembly comprising LED 360, circuit board 310', and insulating member 540 which carries electrical terminals or contacts 510, 530. Preferably, LED 360 is mounted to a circuit board 310' that is configured for facilitating the making electrical connections to LED 360 and that may be thermally conductive for conducting heat from LED 360, e.g., to thermally conductive reflector 28' and then to face cap 24' and light body 40' from where heat can be dissipated. In addition, the rearward surface of reflector 28' may be generally planar at locations radially outward of opening 29' so as to bear against generally planar circuit board 310' for conducting heat therefrom, and circuit board 310' may include electrically conductive members 311' for making connections to LED 360, to contact 530 via tabs 532 soldered thereto, and to spring 510. Conductors 311' may also be thermally conductive, and additional conductors 311' may be provided, for increasing the thermal conductivity of circuit board 310 so that heat generated by LED 360 is more efficiently conducted to reflector 28'. Clearance recesses 28C may be provided so that electrically conductive reflector 28' and tabs 532 do not make electrical contact.

Preferably, reflector 28' has a circular recess 28R at the rear thereof into which insulating member 540 which is circular fits, and insulating member 540 may have a recess in the forward end thereof into which circuit board 310' carrying LED 360 fits, whereby LED 360 is positioned thereby relatively concentric to reflector 28' so as to be in the proper position for its light to be reflected by the reflecting surface, e.g., a generally parabolic surface, thereof to be projected through lens 26. Preferably the recess 28R, the periphery of insulator 540 and the recess therein, circuit board 310' and LED are concentric so as to properly position LED 360 relative to reflector 360. However, circuit board 310' and the recess of insulating member 540 may be non-circular, e.g., D-shaped or having a notch or the like, so that circuit board 310' and insulating member 540 are in a predetermined angular relationship defined in relation to the polarity of LED 360 and the electrical voltage applied thereto via terminals 510, 520, 530. Preferably, however, circuit board 310' and insulator 540 are configured so that they may be assembled in any relative angular position so as to simplify assembly.

Terminals 510, 520, 530 preferably are three concentric terminals so that spring contacts 420, 430 which are at predetermined radial distances will contact circular terminals 520, 530, respectively, irrespective of the angular position of head 20' when the assembly of head 20' which includes face cap 24', reflector 28' and insulating member 540, is screwed onto the forward external threads of light body 40'. Center spring terminal 510 connects the forward terminal of battery 149 to one lead of LED 360, e.g., the negative terminal of battery 149 to the negative lead of LED 360, via a conductor of circuit board 310', and via reflector 28' to outer circular conductor 520 from which is connects to circuit board 440 via leaf spring terminal 420. Inner circular terminal 530 may connect, e.g., via conductor tabs 532 thereof that pass through openings 542 of insulator 540, to circuit board 310' and to the other lead of LED 360, e.g., the positive lead thereof, for providing connection of LED 360 to circuit board 440 via leaf spring terminal 430.

Circular flange 28F of reflector 28' that defines recess 28R extends rearwardly beyond insulating member 540 and is bent inwardly, e.g., roll formed or swaged, so as to secure insulating member 540 in recess 28R and provide outer circular contact 520. Flange 28F may be a continuous circular flange, or may be segmented or may be a plurality of tabs, that is or are bent inward, or may be another circular contact 520. Insulating member 540 is of an electrically insulating material, and may also be of relatively good thermal conductivity, so as to conduct heat away from LED 360, e.g., to reflector 28'.

In a typical assembly process, LED 360 is soldered onto circuit board 310' in a predetermined central location, circuit board 310' is placed into the circular cavity of insulating member 540, and tabs 532 are soldered to circuit board 310'. A suitable fixture may be employed for keeping LED 360, circuit board 310', insulating member 540 and circular contact 530 substantially concentric during assembly and soldering. The assembly of LED 360, circuit board 310', insulating member 540 and circular contact 530 is then placed in recess 28R of reflector 28' and flange 28F is formed to provide circular contact 520 and to retain LED 360, circuit board 310', insulating member 540 and circular contact 530 in reflector 28'. Lens 26 and gasket 27 may be placed into face cap 24' and reflector 28' may be threaded therein and tightened using a wrench or other tool that engages recesses 28W.

Alternatively, flange 28F may be axially shorter, e.g., just sufficient to define a circular recess 28R in the rearward end of reflector 28', insulator 540 may be of slightly smaller outside diameter, and a metal cup may provide contact 520. Such metal cup would, e.g., be shaped like a top hat that is open at both ends, with the "brim-like" annular ring providing circular contact 520 and the cylindrical "top-like" portion being pressed into the space between insulating member 540 and the inner circular wall of recess 28R, e.g., as a press fit, force fit, or interference fit, thereby to mechanically secure insulating member 540 having circuit board 310', LED 360, and circular contact 530 thereon in recess 28R of reflector 28' and to provide an electrical connection to LED 360 through circular contact 520, reflector 28' and circuit board 310'.

In one example embodiment, extension 400 and insulating body 450 are of an electrically insulating material, e.g., a plastic, while spring terminal 510 and leaf contacts 520, 530 are of an electrically conductive material, preferably a springy metal, e.g., copper, brass, beryllium copper, and the like. Where light 10' is likely to be utilized in an environment where it will receive substantial mechanical shock, such as a gun mounted light, a suitable plastic, such as a VALOX® polybutylene terephthalate (PBT) plastic, may be employed. Circular terminals 520, 530 are of electrically conductive material, e.g., a metal, such as copper, brass, aluminum, and the like. Terminals 420, 430 are preferably a resilient metal strip that is bent so as to compress and deform tangentially, but not radially, when reflector 28' is threaded onto light body 40', but not to permanently deform. Reflector 28' is electrically conductive, and face cap 24' and reflector 28' are preferably of a material also having relatively high thermal conductivity, e.g., a metal, such as aluminum or brass, or a plastic or resin that is filled (loaded) with thermally conductive and/or electrically conductive particles.

A light 10, 10' mountable on a mounting rail 200 comprises a light body 40, 40' containing a light source 360, a source 149 of electrical energy and a switch 32, 106 for selectively coupling the light source 360 and the source 149 of electrical energy in circuit for producing light. A mounting arrangement 50 on the light body 40, 40' is for mounting the light body 40, 40' on a mounting rail 200 comprises a fixed clamp member 52 on the light body 40, 40', a movable clamp member 54 opposing the fixed clamp member 52 and movable closer to and farther from the fixed clamp member 52, and a clamping device 56, 58 coupling the movable clamp member 54 and the fixed clamp member 52 for biasing the movable clamp member 54 toward the fixed clamp member 52 and for moving the movable clamp member 54 closer to and farther from the fixed clamp member 52, whereby a mounting rail 200 may be clamped between the fixed clamp member 52 and the movable clamp member 54.

A mounting arrangement 50 for mounting an object on a mounting rail 200 comprises a fixed clamp member 52 on the object, a movable clamp member 54 opposing the fixed clamp member 52 and movable closer to and farther from the fixed clamp member 52, a clamping device 56, 58 coupling the movable clamp member 54 and the fixed clamp member 52 for biasing the movable clamp member 54 toward the fixed clamp member 52 and for moving the movable clamp member 54 closer to and farther from the fixed clamp member 52, whereby a mounting rail 200 may be clamped between the fixed clamp member 52 and the movable clamp member 54.

A light 10, 10' mountable on a mounting rail 200 comprises a light body 40, 40' containing a light source 360, a source 149 of electrical energy and a switch 32, for selectively coupling the light source 360 and the source 149 of electrical energy in circuit for producing light. A mounting arrangement 50 on the light body 40, 40' is for mounting the light body 40, 40' on a mounting rail 200 having a keying feature 208. The mounting arrangement 50 comprises first and second clamp members 52, 54 on the light body 40, 40' movable closer together for clamping a mounting rail 200 and farther apart for releasing the mounting rail 200, whereby a mounting rail 200 may be clamped between the first and second clamp members 52, 54. The light body 40, 40' has a recess 42, 42' located on the light body 40, 40' between the first and second clamp members 52, 54 and a keying member 60, 60' removably disposed in the recess 42, 42' of the light body 40, 40', the keying member 60, 60' having a keying feature 64, 64' that engages the keying feature 208 of the mounting rail 200 when the light body 40, 40' is clamped to the mounting rail 200 by the first and second clamping members 52, 54.

A mounting arrangement 50, 60, 60' for mounting an object on a mounting rail 200 having a keying feature 208 comprises first and second clamp members 52, 54 on the object movable closer together for clamping a mounting rail 200 and farther apart for releasing the mounting rail 200, whereby a mounting rail 200 may be clamped between the first and second clamp members 52, 54. The object has a recess 42, 42' located on the object between the first and second clamp members 52, 54, and a keying member 60, 60' removably disposed in the recess 42, 42' of the object, the keying member 60, 60' having a keying feature 64, 64' that engages the keying feature 208 of the mounting rail 200 when the object is clamped to the mounting rail 200 by the first and second clamping members 52, 54.

A light 10, 10' mountable on a mounting rail 200 comprises a light body 40, 40' containing a light source 360, a source 149 of electrical energy and a switch 32 for selectively coupling the light source 360 and the source 149 of electrical energy in circuit for producing light. A mounting arrangement 50, 60, 60' on the light body 40, 40' for mounting the light body 40, 40' on a mounting rail 200 having a keying feature 208 comprises a fixed clamp member 52 on the light body 40, 40', a movable clamp member 54 opposing the fixed clamp member 52 and movable closer to and farther from the fixed clamp member 52, a clamping device 56, 58 coupling the movable clamp member 54 and the fixed clamp member 52 for moving the movable clamp member 54 closer to and farther from the fixed clamp member 52, whereby a mounting rail 200 may be clamped between the fixed clamp member 52 and the movable clamp member 54. The light body 40, 40' has a recess 42, 42' located on the light body 40, 40' between the fixed clamp member 52 and the movable clamp member 54, and a keying member 60, 60' removably disposed in the recess 42, 42' of the light body 40, 40', the keying member 60, 60' having a keying feature 64, 64' that engages the keying feature 208 of the mounting rail 200 when the light body 40, 40' is clamped to the mounting rail 200 by the fixed and movable clamping members 52, 54.

The light 10, 10' is mountable on mounting rails 200 having keying features of different sizes and shapes, and wherein the keying member 60, 60' is selected from a set of keying members 60, 60' for having a keying feature 64, 64' of a size and shape that corresponds to the size and shape of the keying feature 208 of the mounting rail 200.

A light 10, 10' comprises a light body 40, 40' including a mounting surface 48 having a predetermined peripheral shape, a reflector 28 having an opening 29 adapted for receiving a light source 360 disposed proximate the mounting surface 48 of the light body 40, 40'. An electrical circuit structure 300 has at least a portion thereof that has a peripheral shape corresponding to the predetermined peripheral shape of the mounting surface 48 that is disposed adjacent the mounting surface 48 between the mounting surface 48 and the reflector 28, wherein the portion 310 of the electrical circuit structure has an opening 312 therethrough opposing the opening 29 of the reflector 28 and adapted for receiving a light source 360. A light source 360 is disposed in the opening 312 of the electrical circuit structure 300, 300' and abutting the mounting surface 48 for producing light in response to electrical energy applied via the electrical circuit structure 300, wherein the light source 360 extends into the opening 29 of the reflector 28 for producing light therein.

In the light 10, 10', the reflector 28 has an optical axis extending through the opening 29 therein, the light source 360 has an optical axis about which light is produced, and the optical axes of the reflector 28 and of the light source 360 are substantially coaxial when the light source 360 is disposed in the opening 312 of the circuit structure 300, abutting the mounting surface 48 and extending into the opening 29 of the reflector 28.

A light 10, 10' mountable on an object may comprise: a light body 40, 40' for supporting an illumination light source 360 and having a cavity for receiving one or more batteries therein; a mounting arrangement on the light body 40, 40' for mounting the light 10, 10' on an object; an illumination light source 360 disposed in the light body 40, 40' for selectively providing illumination in a given direction; a cover (housing) 100 attached to the light body 40, 40' for receiving an optional aiming light source 110 therein for optionally providing aiming light in the given direction; an electrical switch 32 for selectively actuating the light source 360, the optional aiming light source 110, or both; and an electrical circuit structure disposed in the light body 40, 40' and having terminals for receiving electrical potential from a battery when the one or more batteries are provided in the cavity of the light body 40, 40', wherein the electrical circuit structure provides electrical connections among the illumination light source 360, the optional aiming light source 110, the electrical switch 32, and the terminals, wherein the electrical switch 32 selectively connects the illumination light source 360 to the terminals via the electrical circuit structure and selectively connects the optional illumination source to the terminals via the electrical circuit structure. The illumination light source 360 may be a light-emitting diode, or the optional aiming light source 110 may be a laser light source, or the illumination light source 360 may be a light-emitting diode and the optional aiming light source 110 may be a laser light source. The electrical circuit structure may comprise first and second planar connected circuit portions, wherein the first planar circuit portion may be disposed in the light body 40, 40' for connecting to the illumination light source 360 and wherein the second planar circuit portion may be disposed for connecting to the electrical switch 32. The electrical circuit structure may further comprise: at least a third substantially planar circuit portion disposed in a third different plane and having electrical conductors thereon connected to the first and second planar circuit portions, wherein the third planar circuit portion is for connecting to the optional aiming light source 110, and wherein the electrical switch 32 connected to the second planar circuit portion is for selectively applying electrical energy to at least one of the electrical conductors thereon for selectively energizing the optional aiming light source 110. A separable electrical connector may be interposed between the first and second planar circuit portions or between the first and third planar circuit portions for providing separable electrical connections therebetween. The electrical circuit structure may comprise: at least first and second substantially planar circuit portions disposed in two different planes and having electrical conductors thereon, the first planar circuit portion having a peripheral shape corresponding to a shape of a planar mounting surface of the light body 40, 40' adjacent to which it may be mounted, the first planar circuit portion having an opening therein in a predetermined location relative to the peripheral shape thereof, wherein the opening is for receiving the illumination light source 360; wherein the illumination light source 360 may be in the opening of the first planar circuit portion for receiving electrical energy from the electrical conductors; and wherein the electrical switch 32 may be connected to the second planar circuit portion for selectively applying electrical energy to at least one of the electrical conductors thereon for selectively energizing the illumination light source 360. The peripheral shape of the first planar circuit portion may cooperate with the corresponding shape of the planar mounting surface of the light body 40, 40' adjacent to which it may be mounted for positioning the illumination light source 360 for providing light in a given direction. The electrical circuit structure may further comprise: at least a third substantially planar circuit portion disposed in a third different plane and having electrical conductors thereon, wherein the third planar circuit portion is for connecting to the optional aiming light source 110, and wherein the electrical switch 32 connected to the second planar circuit portion is for selectively applying electrical energy to at least one of the electrical conductors thereon for selectively energizing the optional aiming light source 110. A separable electrical connector may be interposed between the first and second planar circuit portions or between the first and third planar circuit portions for providing separable electrical connections therebetween. A second electrical switch 32 may be provided for selectively connecting the one or more batteries with the terminals of the electrical circuit structure when the one or more batteries are provided in the cavity of the light body 40, 40'.

An electrical circuit structure for a light 10, 10' may comprise: at least first and second substantially planar circuit portions disposed in two different planes and having electrical conductors thereon, the first planar circuit portion having a peripheral shape corresponding to the shape of a planar mounting surface adjacent to which it is adapted to be mounted, the first planar circuit portion having an opening therein in a predetermined location relative to the peripheral shape thereof, wherein the opening is for receiving a light source 360; a light source 360 mounted in the opening of the first planar circuit portion for receiving electrical energy from the electrical conductors; and a switch 32 mounted to the second planar circuit portion for selectively applying electrical energy to at least one of the electrical conductors thereon for selectively energizing the light source 360. The peripheral shape of the first planar circuit portion may cooperate with the corresponding shape of the planar mounting surface for positioning the light source 360 for providing light in a given direction. The electrical circuit structure may further comprise: at least a third substantially planar circuit portion disposed in a third different plane and having electrical conductors thereon, and a laser light source mounted to the third planar circuit portion, wherein the switch 32 mounted to the second planar circuit portion is for selectively applying electrical energy to at least one of the electrical conductors thereon for selectively energizing the laser light source. A separable electrical connector may be interposed between the first and third planar circuit portions for providing separable electrical connections therebetween, or between the first and second planar circuit portions for providing separable electrical connections therebetween.

A light 10, 10' may comprise: a light body 40, 40' for supporting an illumination light source 360 and having a cavity for receiving a battery therein; a first light source 360 disposed in the light body 40, 40' for selectively providing illumination in a given direction; a cover (housing) 100 attached to the light body 40, 40' for receiving an optional second light source 110 therein for optionally providing light in the given direction; a switch 32 for selectively energizing the first light source 360, the optional second light source 110, or both; and a circuit structure in the light body 40, 40' and having terminals for receiving electrical potential, wherein the circuit structure provides electrical connections among the first light source 360, the optional second light source 110, the switch 32, and the terminals, wherein the switch 32 selectively connects the first light source 360 to the terminals via the electrical circuit and selectively connects the optional second light source 110 to the terminals via the circuit structure. The first light source 360 may be a light-emitting diode, or the optional second light source 110 may be a laser aiming light, or wherein the first light source 360 may be a light-emitting diode and the optional second light source 110 may be a laser aiming light. The circuit structure may comprise first and second connected circuit portions, wherein the first circuit portion is for connecting to the first light source 360 and wherein the second circuit portion is for connecting to the switch 32. A separable electrical connector may be provided between the first and second circuit portions. The circuit structure may further comprise: at least a third circuit portion having electrical conductors thereon connected to the first and second circuit portions, wherein the third circuit portion is for connecting to the optional second light source 110, and wherein the switch 32 connected to the second circuit portion is for selectively energizing the optional second light source 110. A separable electrical connector may be interposed between the first and second circuit portions or between the first and third circuit portions for providing separable electrical connections therebetween. The circuit structure may comprise: at least first and second circuit portions having electrical conductors thereon, the first circuit portion having a peripheral shape corresponding to a shape of a mounting surface adjacent to which it is to be mounted, the first circuit portion having an opening therein in a predetermined location relative to the peripheral shape thereof, wherein the first light source 360 is in the opening of the first circuit portion for receiving electrical energy from the electrical conductors; and wherein the switch 32 is connected to the second circuit portion for selectively energizing the first light source 360. The circuit structure may further comprise: at least a third circuit portion having electrical conductors thereon, wherein the optional second light source 110 connects to the third circuit portion, and wherein the switch 32 mounted to the second circuit portion is for selectively energizing the optional second light source 110. A separable connector may be provided between the first and second circuit portions or between the first and third circuit portions.

A light 10, 10' may comprise: a light body 40, 40' for supporting an illumination light source 360 and having a cavity for receiving a battery therein; a first light source 360 disposed in the light body 40, 40' for selectively providing illumination in a given direction; a cover (housing) 100 attached to the light body 40, 40' for receiving an optional second light source 110 therein for optionally providing light in the given direction; a switch 32 for selectively energizing the first light source 360, the optional second light source 110, or both; and a circuit structure in the light body 40, 40' and having terminals for receiving electrical potential, the circuit structure including first, second and third connected circuit portions, wherein the first circuit portion is for connecting to the first light source 360, wherein the second circuit portion is for connecting to the switch 32. wherein the third circuit portion is for connecting to the optional second light source 110, and wherein the circuit structure provides electrical connections among the first light source 360, the optional second light source 110, the switch 32, and the terminals, wherein the switch 32 selectively connects the first light source 360, the optional second light source 110, or both, to the terminals via the circuit structure. The first light source 360 may be for providing illuminating light and the optional second light source 110 may be for optionally providing aiming light. The first light source 360 may provide the illuminating light in a given direction and the optional second light source 110 may optionally provide the aiming light in the same direction. The first light source 360 may be a light-emitting diode, or the optional second light source 110 may be a laser aiming light, or the first light source 360 may be a light-emitting diode and the optional second light source 110 may be a laser aiming light. A separable connector may be interposed between the first and second circuit portions or between the first and third circuit portions.

A light 10, 10' may comprise: a light body 40, 40' for supporting an illumination light source 360 and having a cavity for receiving a battery therein; a first light source 360 disposed in the light body 40, 40' for selectively providing illumination in a given direction; a cover (housing) 100 attached to the light body 40, 40' for receiving an optional second light source 110 therein for optionally providing light in the given direction; a switch 32 for selectively energizing the first light source 360, the optional second light source 110, or both; and a circuit structure in the light body 40, 40' and having terminals for receiving electrical potential, the circuit structure including at least first and second connected circuit portions, wherein the first circuit portion is for connecting to the first light source 360, wherein the second circuit portion is for connecting to the optional second light source 110, and wherein the circuit structure provides electrical connections among the first light source 360, the optional second light source 110, the switch 32, and the terminals, a separable connector interposed between the first and second circuit portions, whereby the optional second light source 110 is removable; wherein the switch 32 selectively connects the first light source 360, the optional second light source 110, or both, to the terminals via the circuit structure. The first light source 360 may be for providing illuminating light and the optional second light source 110 may be for optionally providing aiming light. The first light source 360 may be a light emitting diode for providing illuminating light and the optional second light source 110 may be a laser aiming light for optionally providing aiming light.

A keyed mounting arrangement 50, 50' for a light 10, 10' mountable on a mounting rail 200 having a keying feature, the keyed mounting arrangement 50, 50' may comprise: a light body 40, 40' containing a light source 360, a cavity 405 for receiving a source of electrical energy 149, and a switch 30 for selectively coupling the light source 360 in circuit with the source of electrical energy 149 for producing light when a source of electrical energy is in the cavity; a clamping arrangement 50, 50' including first and second clamp members 52, 54, on the light body 40, 40' movable closer together for clamping a mounting rail 200 therebetween and movable farther apart for releasing the mounting rail, whereby a mounting rail may be clamped between the first and second clamp members; and a keying member 60, 60' removably disposed in a recess located on the light body 40, 40' between the first and second clamp members 52, 54 in a predetermined location with respect to a fixed one of the first and second clamping members 52, 54, the keying member 60, 60' having a keying feature that engages the keying feature of the mounting rail 200 when the light body 40, 40' is clamped to the mounting rail by the first and second clamping members 52, 54. The keying member 60, 60' may be retained in the recess by the clamping arrangement 50, 50'; or the location of the keying member 60, 60' in the recess may be determined by the clamping arrangement 50, 50; or the keying member 60, 60' may be retained in the recess by the clamping arrangement 50, 50' and the location of the keying member 60, 60' in the recess may be determined by the clamping arrangement. The clamping arrangement 50, 50' may include a clamp screw 56, wherein the keying member 60' is located and retained in the recess by the clamp screw 56. One of the first and second clamp members 52, 54 may be movable and may include at least one post 54P, wherein: the light body may have a hole therein for receiving the post 54P; or the keying member 60' may have a hole therein for receiving the post 54P; or the light body 40, 40' may have a hole therein for receiving the post 54P and the keying member 60' may have a hole therein for receiving the post. The light 10, 10' may be mountable on mounting rails 200 having keying features of different sizes and shapes, and wherein the keying member 60, 60' may be selected from a set of keying members 62, 62A-64E for having a keying feature of a size and shape that corresponds to the size and shape of the keying feature of the mounting rail. The recess of the light body 40, 40' may be a channel, and wherein the keying member 60, 60' may have a key body that fits into the channel of the light body in a predetermined location determined by the clamping arrangement 50, 50' and may have a key feature on the key body. The key body 63, 63' may be removably retained in the predetermined position in the channel of the light body 40, 40' by a fastener 56 of the clamping arrangement 50, 50' that engages the key body. The key feature may include a projection 64, 64A-64E extending from the key body. The recess of the light body 40, 40' may be a channel, and wherein the keying member 60, 60' may have a key body 63, 63' that fits into the channel of the light body 40, 40' in a predetermined location determined by an arcuate extension 68' of the key body 63' that engages the light body 40'. The first clamp member 52 may comprise an elongated longitudinal clamp member 52 fixed on the light body 40, 40' and wherein the second clamp member 54 may comprise a movable elongated clamp member 54 disposed longitudinally and movably adjacent the light body 40, 40' opposing the fixed clamp member 52 and spaced apart therefrom. One or both of the fixed elongated longitudinal clamp member 52 and the movable elongated longitudinal clamp member 54 may have an elongated longitudinal chamfered edge for facilitating the mounting in a snap-on, snap-off manner. The clamping arrangement 50, 50' may include a clamp screw 56, and may further include removable means 57 for retaining the clamp screw 56 with the clamping arrangement 50, 50'.

A set of interchangeable keying members 62, 62A-62E for keying a mountable body 40, 40' that is mountable on mounting rails 200 having keying features of different sizes and shapes, each of the keying members 62, 62A-62E of the set may comprise: a key body 63, 63' of a size and a shape for being disposed in a recess of the mountable body 40, 40', the key body 63, 63' having a feature that is for being engaged by a shaft 56 of a mounting arrangement 50, 50' of the mountable body when the key body is disposed in the recess of the mountable body 40, 40; a keying feature 64, 64A-64E of the key body 63, 63', the keying feature having a size and a shape that corresponds to the size and shape of the keying feature of the mounting rail 200; the keying feature 64, 64A-64E being positioned on the key body 63, 63' in a location for engaging the keying feature of the mounting rail 200 when the mountable body 40, 40' is mounted to the mounting rail 200; wherein the size, or shape, or position, or a combination of size, shape and position, of the keying feature 64, 64A-64E on the key body of each of the keying members 62, 62A-62E of the set of keying members 62, 62A-62E is different and corresponds to a keying feature of a mounting rail 200. The keying feature 64, 64A-64E of the key body 63, 63' of each of the keying members 62, 62A-62E of the set may comprise a projection 64, 64A-64E that engages a corresponding recess keying feature of the mounting rail 200. The feature that is for being engaged by a shaft 56, 68 of a mounting arrangement 50, 50' of the mountable body 40, 40' may include the key body 63, 63' having a hole therethrough for receiving the shaft 56, 68. The key body 63, 63' may further include an extension 68' having a shape complementary to a shape of the mountable body 40, 40' so that the extension 68' is adjacent the mountable body 40, 40' when the keying member 62, 62A-62E is disposed in the recess of the mountable body 40, 40', and the extension 68' may be an arcuate extension 68'.

A keyed mounting arrangement 50, 50' for an object 10, 10' mountable on a mounting rail 200 having a keying feature, the keyed mounting arrangement 50, 50' may comprise: an object body 40, 40' containing operative elements of the object 10, 10'; a clamping arrangement 50, 50' including first and second clamp members 52, 54 on the object body 40, 40' movable closer together for clamping a mounting rail 200 therebetween and movable farther apart for releasing the mounting rail 200, whereby a mounting rail may be clamped between the first and second clamp members 52, 54; and a keying member 60, 60' removably disposed in a recess located on the object body 40, 40' between the first and second clamp members 52, 54 in a predetermined location with respect to a fixed one of the first and second clamping members 52, 54, the keying member 60, 60' having a keying feature 64, 64A-64E that engages the keying feature of the mounting rail 200 when the object body 40, 40' is clamped to the mounting rail 200 by the first and second clamping members 52, 54. The keying member 60, 60' may be retained in the recess by the clamping arrangement 50, 50'; or the location of the keying member 60, 60' in the recess may be determined by the clamping arrangement 50, 50; or the keying member 60, 60' may be retained in the recess by the clamping arrangement 50, 50' and the location of the keying member 64, 64A-64E in the recess may be determined by the clamping arrangement 50, 50'. The clamping arrangement 50, 50' may include a clamp screw 56, 68, wherein the keying member 60, 60' may be located and retained in the recess by the clamp screw 56, 68. One of the first and second clamp members 52, 54 is movable and includes at least one post 54P, wherein: the object body 40, 40' may have a hole therein for receiving the post 54P; or the keying member 60, 60' may have a hole therein for receiving the post 54P; or the object body 40, 40' may have a hole therein for receiving the post 54P and the keying member 60, 60' may have a hole therein for receiving the post 54P. The object 10, 10' may be mountable on mounting rails 200 having keying features of different sizes and shapes, and wherein the keying member 60, 60' may be selected from a set of keying members 62, 62A-62E for having a keying feature of a size and shape that corresponds to the size and shape of the keying feature of the mounting rail 200. The recess of the object body 40, 40' may be a channel, and wherein the keying member 60, 60' may have a key body 63, 63' that fits into the channel of the object body 40, 40' in a predetermined location determined by the clamping arrangement 50, 50' and has a key feature 64, 64A-64E on the key body 63, 63'. The key body 63, 63' may be removably retained in the predetermined position in the channel of the object body 40, 40' by a fastener 56, 68 of the clamping arrangement 50, 50' that engages the key body 63, 63'. The key feature 64, 64A-64E may include a projection extending from the key body 63, 63'. The recess of the object body 40, 40' may be a channel, and wherein the keying member 60, 60' may have a key body 63, 63' that fits into the channel of the object body 40, 40' in a predetermined location determined by an arcuate extension 68' of the key body 63, 63' that engages the object body 40, 40'. The first clamp member 52 may comprise an elongated longitudinal clamp member 52 fixed on the object body 40, 40' and wherein the second clamp member 54 may comprise a movable elongated clamp member 54 disposed longitudinally and movably adjacent the object body 40, 40' opposing the fixed clamp member 52 and spaced apart therefrom. One or both of the fixed elongated longitudinal clamp member 52 and the movable elongated longitudinal clamp member 54 may have an elongated longitudinal chamfered edge for facilitating the mounting in a snap-on, snap-off manner. The clamping arrangement 50, 50' may include a clamp screw 56, and may further include removable means 57 for retaining the clamp screw with the clamping arrangement 50, 50'.

A light may comprise: a light body having a cavity for receiving a source of electrical power therein, the light body having a threaded opening to the cavity; a head including a light source, the head having a threaded end for engaging the threaded opening of the light body for covering the threaded opening and the cavity therein; at least three concentric electrical contacts at the threaded end of the head and concentric with the thread thereat, wherein the at least three concentric electrical contacts are enclosed by the head and the light body when the head is threaded to the light body, and wherein at least one of the at least three concentric electrical contacts provides an electrical connection to the light source of the head and wherein at least one of the at least three concentric electrical contacts provides an electrical connection to a source of electrical power when a source of electrical power is disposed in the cavity of the light body, whereby the head may serve as a removable cover for facilitating the placing of a source of electrical power into the cavity of the light body and the removing of a source of electrical power from the light body. The light body includes at least two electrical contacts extending toward the threaded end of the light body and disposed radially with respect to the threaded end thereof for making electrical contact with at least two of the at least three concentric electrical contacts of the head. The at least two electrical contacts extend from an electrical circuit structure internal to the light body; or the at least two electrical contacts connect to an electronic circuit internal to the light body for controlling electrical power applied to the light source; or the at least two electrical contacts extend from an electrical circuit structure internal to the light body providing an electronic circuit internal to the light body for controlling electrical power applied to the light source. The light source of the head includes a first electrical lead connecting to one of the at least three concentric electrical contacts and a second electrical lead connecting to another one of the at least three concentric electrical contacts. The at least three concentric electrical contacts comprise a central spring contact, a first circular electrical contact surrounding the central spring contact, and a second circular electrical contact surrounding the first circular electrical contact. The head comprises a reflector having the light source of the head disposed in an opening therein and having a recess of a given shape in the rear end thereof, an insulating member of the given shape disposed in the recess of the reflector, wherein the insulating member supports a central one of the at least three concentric electrical contacts and a circular one of the at least three concentric electrical contacts. The reflector provides a third one of the at least three concentric electrical contacts. The reflector and the insulating member are circular, and wherein the light source includes a light emitting diode on a circular circuit board, wherein the insulating member supports the circular circuit board in a circular recess thereof. The reflector and the recess therein, the insulating member and the recess therein, the light emitting diode and the circular circuit board, are all concentric.

A head for a light having a threaded opening may comprise: a reflector; a light source proximate the reflector and including a light emitting diode on a circuit board; a threaded end for engaging the threaded opening for covering the threaded opening; at least three concentric electrical contacts at the threaded end and concentric therewith, wherein the at least three concentric electrical contacts are enclosed when the head is threaded to the light, wherein the at least three concentric electrical contacts include a central spring contact, a first circular electrical contact surrounding the central spring contact, and a second circular electrical contact surrounding the first circular electrical contact; wherein at least one of the at least three concentric electrical contacts provides an electrical connection to the light source of the head and wherein at least one of the at least three concentric electrical contacts provides an electrical connection to a source of electrical power when a source of electrical power is disposed in the cavity of the light body; an insulating member supported by the reflector; and wherein the insulating member supports the circuit board and ones of the at least three concentric electrical contacts.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such.

Although terms of position, orientation and/or direction such as "up," "down," "left," "right," "front," "rear," "forward," "backward," "under" and/or "over," and the like may be used herein as a convenience in describing one or more embodiments and/or uses of the present arrangement, the articles described may be positioned in any desired position and/or orientation, and may be utilized in any desired position, orientation and/or direction. Such terms of position and/or orientation should be understood as being for convenience only, and not as limiting of the invention as claimed.

While the present invention has been described in terms of the foregoing example embodiments, variations within the scope and spirit of the present invention as defined by the claims following will be apparent to those skilled in the art. For example, while the clamping device is described in the examples herein as a clamp screw 56, other clamping devices may be employed. One example is a lever having an offset lobe that pulls a rod attached to movable clamp member 54 through hole 44 tight as the lobed lever is engaged, and such lever may or may not threadingly engage a hole in movable member 54. In addition, biasing spring 58 need not be a wave spring, but may be, e.g., a helical or other spring providing suitable bias, if desired.

Although keying members having a projecting keying feature are described for engaging mounting rails having a recessed keying feature, the keying member may have a recessed keying feature corresponding to a projecting keying feature of a mounting rail, or the keying member may have both recessed and projecting keying features corresponding to projecting and recessed keying features of a mounting rail. Similarly, keying member 62, 62' may have a recess that fits onto a projection from light body 40, 40' in place of the recess 42, 42' in light body 40, 40' that receives the body 63, 63' of key member 62, 62'.

Where a separate keying member 62, 62' is not employed, clamping device 56 may be located in a position wherein it traverses the cavity 41 defined by fixed clamping member 52 and movable clamping member 54 for receiving a mounting rail, so that the shank or shaft of clamping device 56 may serve as a keying feature for engaging a transverse slot in a mounting rail.

Although light 10, 10' may employ more than one battery as illustrated, it may also employ a single battery. It is noted that the voltage of the battery, either initially or when partially discharged, need not be sufficient to operate the LED light source for producing a desired level of light where a voltage boosting circuit is provided in light 10, 10'. One suitable voltage boosting arrangement is described in U.S. patent application Ser. No. 11/335,486 filed Jan. 19, 2006, entitled ELECTRONIC CIRCUIT REDUCING AND BOOSTING VOLTAGE FOR CONTROLLING LED CURRENT, now U.S. Pat. No. 7,466,082, which is hereby incorporated herein by reference in its entirety.

While example light 10' is shown with light body 40' having a cylindrical threaded front end onto which head 20 is threaded, e.g., by the threads of face cap 24' engaging the threads of light body 40', the threads may be opposite to that shown so that light body 40' has internal threads and head 20' has external threads. Further, head 20' and light body 40' may each have centrally located threads, one a threaded shaft and the other a threaded hole which engage when head 20' and body 40' are threaded together. In the latter case, each of the three concentric electrical contacts 510-530 would be a circular contact that surrounds and is concentric with the threaded shaft or threaded hole of head 20'.

Further, circuit structure 300, may be a unitary circuit board or may be an assembly of two or more circuit boards, as may be convenient in a particular instance. In such cases, circuit portion 310 may be of a relatively rigid circuit board material and circuit portions 320-350 may be of a relatively flexible circuit board material. Alternatively, circuit structure 300, may be an assembly of circuit boards and electrical ribbon cable.

Where circuit board 300 is a unitary circuit board made of a flexible or bendable electronic substrate material, circuit portion 310 thereof may be bonded to a rigid spacer that is, e.g., of the predetermined peripheral shape for positioning portion 310 relative to mounting surface 48 and reflector 28.

Optionally, an insulating spacer, e.g. insulator 308, may be interposed between one or more portions of circuit board 300, and light body 40, e.g., between circuit portion 310 and mounting surface 48 as shown in FIG. 8, for electrically insulating the conductors on circuit structure 300, from body 40 which may be of aluminum or other electrically conductive material, but which may be of nylon or plastic or other insulating material. Typically, insulator 308 is of the same general shape as circuit board portion 310 and mounting surface 48, e.g., a "D" shape.

While the light and mount arrangement described herein is described in the context of a gun and a gun-mountable light, it is contemplated that the described mounting arrangement may also be utilized for mounting objects other than a light and/or for mounting objects other than to a gun or other firearm. As used herein, a gun may refer to any firearm, such as a handgun or pistol, a long gun or rifle, a shotgun, or another type of gun or weapon. In addition, the light and mounting arrangement described herein may be disposed on the top side of a weapon or other implement, or on the bottom thereof, or an either side thereof.

In addition, certain aspects of the arrangements described herein may be utilized with lights that are not mountable. E.g., the head 20' arrangement and the concentric contacts 510, 520, 530 thereof may be employed with any kind of light, whether the light is portable, hand-held, fixed, a flashlight, or otherwise, as well as with any other type of device that may employ a head as a removable access to a battery or other internal component.

The term "light" is contemplated to encompass any device that produces or otherwise provides illumination of any type and from any source, whether a conventional incandescent or other lamp, a specialized lamp, a laser source, or a solid state light source such as an LED or a laser diode, irrespective of whether the power source includes one or more batteries within or without the light or a wire or cable connection to a fixed or portable power source wherever located.

Various screws herein, such as key screw 68, housing screws 102, aiming set screws 122, 124, are typically Allen head or Torx head screws, but may be Phillips head, flat-blade head or other types of screws, as desired. However, clamping screw 56 is preferably of a type that can be turned using one's fingers or a coin or some other readily available item without the need for a tool, although a tool may be used if desired. Clamping screw 56, key screw 68, or both, may be a screw, bolt, pin or other suitable fastener.

Further, cover 30 including switch 32 may be replaced by a cover and a remotely operable switch connected by wire or cable, as may be desirable for utilizing light 10 on a long gun, rifle or shotgun wherein light 10 is mounted to a mounting rail 200 proximal the muzzle end thereof and wherein the switch is disposed proximal the trigger or other operator hand position. Further, mounting rail 200 may be of any suitable arrangement, and may be provided by a weapon provider or by a third party for attachment to a weapon or implement and/or those provided as part of a weapon or implement, either as an integral part thereof or as an attachment thereto, as the case may be.

U.S. Provisional Patent Application No. 60/627,860 filed Nov. 15, 2004, entitled LIGHT MOUNTABLE ON A MOUNTING RAIL, U.S. patent application Ser. No. 11/268,787 filed Nov. 8, 2005, entitled LIGHT MOUNTABLE ON A MOUNTING RAIL, now U.S. Pat. No. 7,188,978, and U.S. patent application Ser. No. 11/710,791 filed Feb. 26, 2007, entitled MOUNTABLE LIGHT PROVIDING ILLUMINATION AND OPTIONALLY AIMING, are hereby incorporated herein by reference in their entirety.

What is claimed is:

1. A keyed mounting arrangement for a light mountable on a mounting rail having a keying feature, said keyed mounting arrangement comprising:
   a light body containing a light source, a cavity for receiving a source of electrical energy, and a switch for selectively coupling the light source in circuit with the source of electrical energy for producing light when a source of electrical energy is in the cavity;
   a clamping arrangement on said light body including first and second clamp members movable closer together for clamping a mounting rail therebetween and movable farther apart for releasing the mounting rail, said clamping arrangement including a clamp screw for moving said first and second clamp members closer together and farther apart; and
   a keying member having a key body removably disposed in a recess between said first and second clamp members in a predetermined location with respect to a fixed one of said first and second clamping members, said keying member being separate from said clamp screw and having a keying feature on said key body that engages the keying feature of the mounting rail when the light body is clamped to the mounting rail by said first and second clamp members.

2. The keyed mounting arrangement of claim 1 wherein:
   said keying member is retained in the recess by said clamping arrangement; or
   the location of said keying member in the recess is determined by said clamping arrangement; or
   said keying member is retained in the recess by said clamping arrangement and the location of said keying member in the recess is determined by said clamping arrangement.

3. The keyed mounting arrangement of claim 1 wherein said keying member is located and retained in the recess by the clamp screw.

4. The keyed mounting arrangement of claim 1 wherein one of said first and second clamp members is movable and includes at least one post, wherein:
   said light body has a hole therein for receiving the post; or
   said keying member has a hole therein for receiving the post; or
   said light body has a hole therein for receiving the post and said keying member has a hole therein for receiving the post.

5. The keyed mounting arrangement of claim 1 wherein said light is mountable on mounting rails having keying features of different sizes and shapes, and wherein said keying member is selected from a set of keying members for having a keying feature of a size and shape that corresponds to the size and shape of the keying feature of the mounting rail.

6. The keyed mounting arrangement of claim 1 wherein the recess of said light body is a channel, and wherein said key body of said keying member fits into the channel of said light body in a predetermined location determined by said clamping arrangement.

7. The keyed mounting arrangement of claim 6 wherein said key body is removably retained in the predetermined position in the channel of said light body by a fastener of said clamping arrangement that engages said key body.

8. The keyed mounting arrangement of claim 6 wherein said key feature includes a projection extending from said key body.

9. The keyed mounting arrangement of claim 1 wherein the recess of said light body is a channel, and wherein said key body of said keying member fits into the channel of said light body in a predetermined location determined by an arcuate extension of said key body that engages said light body.

10. The keyed mounting arrangement of claim 1 wherein said first clamp member comprises an elongated longitudinal clamp member fixed on said light body and wherein said second clamp member comprises a movable elongated clamp member disposed longitudinally and movably adjacent said light body opposing said fixed clamp member and spaced apart therefrom.

11. The keyed mounting arrangement of claim 10 wherein one or both of said fixed elongated longitudinal clamp member and said movable elongated longitudinal clamp member has an elongated longitudinal chamfered edge for facilitating the mounting in a snap-on, snap-off manner.

12. The keyed mounting arrangement of claim 1 further including removable means for retaining said clamp screw with said clamping arrangement.

13. A keyed mounting arrangement for an object mountable on a mounting rail having a keying feature, said keyed mounting arrangement comprising:
   an object body containing operative elements of the object;
   a clamping arrangement on said object body including first and second clamp members movable closer together for clamping a mounting rail therebetween and movable farther apart for releasing the mounting rail, said clamping arrangement including a clamp screw for moving said first and second clamp members closer together and farther apart; and
   a keying member having a key body removably disposed in a recess between said first and second clamp members in a predetermined location with respect to a fixed one of said first and second clamping members, said keying member being separate from said clamp screw and having a keying feature on said key body that engages the keying feature of the mounting rail when the object body is clamped to the mounting rail by said first and second clamp members.

14. The keyed mounting arrangement of claim 13 wherein:
   said keying member is retained in the recess by said clamping arrangement; or
   the location of said keying member in the recess is determined by said clamping arrangement; or
   said keying member is retained in the recess by said clamping arrangement and the location of said keying member in the recess is determined by said clamping arrangement.

15. The keyed mounting arrangement of claim 13 wherein said keying member is located and retained in the recess by the clamp screw.

16. The keyed mounting arrangement of claim 13 wherein one of said first and second clamp members is movable and includes at least one post, wherein:

said object body has a hole therein for receiving the post; or
said keying member has a hole therein for receiving the post; or
said object body has a hole therein for receiving the post and said keying member has a hole therein for receiving the post.

17. The keyed mounting arrangement of claim 13 wherein said object is mountable on mounting rails having keying features of different sizes and shapes, and wherein said keying member is selected from a set of keying members for having a keying feature of a size and shape that corresponds to the size and shape of the keying feature of the mounting rail.

18. The keyed mounting arrangement of claim 13 wherein the recess of said object body is a channel, and wherein said key body of said keying member fits into the channel of said object body in a predetermined location determined by said clamping arrangement.

19. The keyed mounting arrangement of claim 18 wherein said key body is removably retained in the predetermined position in the channel of said object body by a fastener of said clamping arrangement that engages said key body.

20. The keyed mounting arrangement of claim 18 wherein said key feature includes a projection extending from said key body.

21. The keyed mounting arrangement of claim 13 wherein the recess of said object body is a channel, and wherein said key body of said keying member fits into the channel of said object body in a predetermined location determined by an arcuate extension of said key body that engages said object body.

22. The keyed mounting arrangement of claim 13 wherein said first clamp member comprises an elongated longitudinal clamp member fixed on said object body and wherein said second clamp member comprises a movable elongated clamp member disposed longitudinally and movably adjacent said object body opposing said fixed clamp member and spaced apart therefrom.

23. The keyed mounting arrangement of claim 22 wherein one or both of said fixed elongated longitudinal clamp member and said movable elongated longitudinal clamp member has an elongated longitudinal chamfered edge for facilitating the mounting in a snap-on, snap-off manner.

24. The keyed mounting arrangement of claim 13 further including removable means for retaining said clamp screw with said clamping arrangement.

25. The keyed mounting arrangement of claim 1 further comprising:
a set of interchangeable keying members having keying features of different sizes and shapes for keying said light body to a keying feature of mounting rails of different sizes and/or shapes, each of said keying members of said set from which said keying member is selected comprising:
a key body of a size and a shape for being disposed in the recess of said light body, said key body being engagable by a shaft of said clamp screw when said key body is disposed in the recess of the light body;
the keying feature of said key body having a size and a shape that corresponds to the size and shape of the keying feature of the mounting rail;
the keying feature being positioned on said key body in a location for engaging the keying feature of the mounting rail when said light body is mounted to the mounting rail by said clamping arrangement;
wherein the size, or shape, or position, or a combination of size, shape and position, of the keying feature on said key body of each of said keying members of said set of keying members is different and corresponds to the keying feature of a mounting rail.

26. The keyed mounting arrangement of claim 25 wherein the keying feature of said key body of each of said keying members of said set comprises a projection that engages a corresponding recess keying feature of the mounting rail.

27. The keyed mounting arrangement of claim 25 wherein:
said key body has a hole therethrough for receiving the shaft of said clamp screw; or
said key body further includes an extension having a shape complementary to a shape of said light body so that the extension is adjacent said light body when said keying member is disposed in the recess of said light body; or
said key body has a hole therethrough for receiving the shaft of said clamp screw and further includes an extension having a shape complementary to a shape of said light body so that the extension is adjacent said light body when said keying member is disposed in the recess of said light body.

28. The keyed mounting arrangement of claim 27 wherein said extension includes an arcuate extension at one end of said key body.

29. The keyed mounting arrangement of claim 13 further comprising:
a set of interchangeable keying members having keying features of different sizes and shapes for keying said object body to a keying feature of mounting rails of different sizes and/or shapes, each of said keying members of said set from which said keying member is selected comprising:
a key body of a size and a shape for being disposed in the recess of said object body, said key body being engagable by a shaft of said clamp screw when said key body is disposed in the recess of the object body;
the keying feature of said key body having a size and a shape that corresponds to the size and shape of the keying feature of the mounting rail;
the keying feature being positioned on said key body in a location for engaging the keying feature of the mounting rail when said object body is mounted to the mounting rail by said clamping arrangement;
wherein the size, or shape, or position, or a combination of size, shape and position, of the keying feature on said key body of each of said keying members of said set of keying members is different and corresponds to the keying feature of a mounting rail.

* * * * *